(12) United States Patent
Hasegawa et al.

(10) Patent No.: US 11,076,305 B2
(45) Date of Patent: Jul. 27, 2021

(54) TRANSMISSION DEVICE, RECEIVING DEVICE, BASE STATION, TERMINAL, AND TRANSMISSION METHOD

(71) Applicant: MITSUBISHI ELECTRIC CORPORATION, Tokyo (JP)

(72) Inventors: Fumihiro Hasegawa, Tokyo (JP); Akinori Taira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 31 days.

(21) Appl. No.: 16/481,255

(22) PCT Filed: Jan. 10, 2018

(86) PCT No.: PCT/JP2018/000358
§ 371 (c)(1),
(2) Date: Jul. 26, 2019

(87) PCT Pub. No.: WO2018/142860
PCT Pub. Date: Aug. 9, 2018

(65) Prior Publication Data
US 2019/0380049 A1 Dec. 12, 2019

(30) Foreign Application Priority Data
Feb. 1, 2017 (WO) .................. PCT/JP2017/003599

(51) Int. Cl.
*H04W 24/02* (2009.01)
*H04B 17/345* (2015.01)
(Continued)

(52) U.S. Cl.
CPC .......... *H04W 24/02* (2013.01); *H04B 17/345* (2015.01); *H04L 5/0051* (2013.01); *H04W 64/00* (2013.01); *H04W 16/28* (2013.01)

(58) Field of Classification Search
None
See application file for complete search history.

(56) References Cited

U.S. PATENT DOCUMENTS 8,914,053 B2 12/2014 Zhu
9,674,004 B2 6/2017 Tanaka
(Continued)

FOREIGN PATENT DOCUMENTS

CN 102714527 A 10/2012
EP 2528244 A2 11/2012
(Continued)

OTHER PUBLICATIONS

European Office Action for European Application No. 18 747 688.2 dated Oct. 14, 2020.
(Continued)

*Primary Examiner* — Ayanah S George
(74) *Attorney, Agent, or Firm* — Birch, Stewart, Kolasch & Birch, LLP

(57) ABSTRACT

A transmission device according to the present invention includes a reference-signal information management unit as an identifier to identify an interfering terminal that is a possible terminal to perform communication interfering with communication with a target terminal that is a destination terminal of a data signal, and a transmitter to set a group ID for reference signal generation to a group formed by the interfering terminal and the target terminal.

14 Claims, 20 Drawing Sheets

(51) Int. Cl.
*H04L 5/00* (2006.01)
*H04W 64/00* (2009.01)
*H04W 16/28* (2009.01)

(56) References Cited

U.S. PATENT DOCUMENTS

| | | | |
|---|---|---|---|
| 2013/0021991 A1 | 1/2013 | Ko et al. | |
| 2014/0071936 A1* | 3/2014 | Zhang | H04W 72/044 370/330 |
| 2014/0153499 A1* | 6/2014 | Wang | H04J 11/005 370/329 |
| 2015/0023279 A1 | 1/2015 | Tomeba et al. | |
| 2017/0104517 A1 | 4/2017 | Kakishima et al. | |
| 2018/0159643 A1* | 6/2018 | Huang | H04W 52/346 |

FOREIGN PATENT DOCUMENTS

| | | |
|---|---|---|
| JP | 2011-44940 A | 3/2011 |
| JP | 2011-114400 A | 6/2011 |
| JP | 2013-187612 A | 9/2013 |
| JP | 2015-502078 A | 1/2015 |
| WO | WO 2013/168298 A1 | 11/2013 |
| WO | WO 2015/141066 A1 | 9/2015 |

OTHER PUBLICATIONS

Extended European Search Report for European Application No. 18747688.2, dated Nov. 25, 2019.
Nokia et al., "On MU MIMO nonlinear precoding in NR," 3GPP TSG RAN WG1 NR Ad-Hoc Meeting, Spokane, USA, Jan. 16-20, 2017, R1-1701087, 8 pages.
3GPP TS 36.211 V14.0.0 (Sep. 2016), Release 14, p. 108.
3GPP TS 36.212 V14.0.0 (Sep. 2016), Release 14, p. 122.
Notification of Reason for Refusal issued in Japanese Application No. 2017-536037, dated Oct. 17, 2017.
Zou et al., "COFDM: An overview," IEEE Transactions on Broadcasting, vol. 41, No. 1, Mar. 1995, pp. 1-8.
Chinese Office Action and Search Report for Chinese Application No. 201880008268.6, dated Apr. 23, 2021, with English translation of the Office Action.

* cited by examiner

FIG.5

| | One Codeword: Codeword 0 enabled, Codeword 1 disabled | | Two Codewords: Codeword 0 enabled, Codeword 1 enabled |
|---|---|---|---|
| VALUE | MESSAGE | VALUE | MESSAGE |
| 0 | 1 layer, port 7, $n_{SCID}=0$ (OCC=2) | 0 | 2 layer, port 7-8, $n_{SCID}=0$ (OCC=2) |
| 1 | 1 layer, port 7, $n_{SCID}=1$ (OCC=2) | 1 | 2 layer, port 7-8, $n_{SCID}=1$ (OCC=2) |
| 2 | 1 layer, port 8, $n_{SCID}=0$ (OCC=2) | 2 | 2 layer, port 7-8, $n_{SCID}=0$ (OCC=4) |
| 3 | 1 layer, port 8, $n_{SCID}=1$ (OCC=2) | 3 | 2 layer, port 7-8, $n_{SCID}=1$ (OCC=4) |
| 4 | 1 layer, port 7, $n_{SCID}=0$ (OCC=4) | 4 | 2 layer, port 11, 13, $n_{SCID}=0$ (OCC=4) |
| 5 | 1 layer, port 7, $n_{SCID}=1$ (OCC=4) | 5 | 2 layer, port 11, 13, $n_{SCID}=1$ (OCC=4) |
| 6 | 1 layer, port 8, $n_{SCID}=0$ (OCC=4) | 6 | 3 layer, port 7-9 |
| 7 | 1 layer, port 8, $n_{SCID}=1$ (OCC=4) | 7 | 4 layer, port 7-10 |
| 8 | 1 layer, port 11, $n_{SCID}=0$ (OCC=4) | 8 | 5 layer, port 7-11 |
| 9 | 1 layer, port 11, $n_{SCID}=1$ (OCC=4) | 9 | 6 layer, port 7-12 |
| 10 | 1 layer, port 13, $n_{SCID}=0$ (OCC=4) | 10 | 7 layers, ports 7-13 |
| 11 | 1 layer, port 13, $n_{SCID}=1$ (OCC=4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

FIG.17

| INDEX | PORT NUMBER | NUMBER OF CDM GROUPS NOT INCLUDING DATA | NUMBER OF DMRS SYMBOLS |
|---|---|---|---|
| 0 | 0 | 1 | 1 |
| 1 | 0 | 2 | 1 |
| 2 | 1 | 1 | 1 |
| 3 | 1 | 2 | 1 |
| 4 | 2 | 2 | 1 |
| 5 | 3 | 2 | 1 |
| 6 | 0, 1 | 1 | 1 |
| 7 | 0, 1 | 2 | 1 |
| 8 | 2, 3 | 2 | 1 |
| 9 | 0, 2 | 2 | 1 |
| 10 | 0, 1, 2 | 2 | 1 |
| 11 | 0, 1, 2, 3 | 2 | 1 |
| 12 | 0 | 2 | 2 |
| 13 | 1 | 2 | 2 |
| 14 | 2 | 2 | 2 |
| 15 | 3 | 2 | 2 |
| 16 | 4 | 2 | 2 |
| 17 | 5 | 2 | 2 |
| 18 | 6 | 2 | 2 |
| 19 | 7 | 2 | 2 |
| 20 | 0, 1 | 2 | 2 |
| 21 | 2, 3 | 2 | 2 |
| 22 | 4, 5 | 2 | 2 |
| 23 | 6, 7 | 2 | 2 |
| 24 | 0, 4 | 2 | 2 |
| 25 | 2, 6 | 2 | 2 |
| 26 | 0, 1, 4 | 2 | 2 |
| 27 | 2, 3, 6 | 2 | 2 |
| 28 | 0, 1, 4, 5 | 2 | 2 |
| 29 | 2, 3, 6, 7 | 2 | 2 |
| 30 | 0, 4, 2, 6 | 2 | 2 |
| 31 | Reserved | reserved | reserved |

FIG.20

| INDEX | PORT NUMBER | NUMBER OF CDM GROUPS NOT INCLUDING DATA | NUMBER OF DMRS SYMBOLS |
|---|---|---|---|
| 0 | 0 | 1 | 1 |
| 1 | 1 | 1 | 1 |
| 2 | 0, 1 | 1 | 1 |
| 3 | 0 | 2 | 1 |
| 4 | 1 | 2 | 1 |
| 5 | 2 | 2 | 1 |
| 6 | 3 | 2 | 1 |
| 7 | 0, 1 | 2 | 1 |
| 8 | 2, 3 | 2 | 1 |
| 9 | 0-2 | 2 | 1 |
| 10 | 0-3 | 2 | 1 |
| 11 | 0 | 3 | 1 |
| 12 | 1 | 3 | 1 |
| 13 | 2 | 3 | 1 |
| 14 | 3 | 3 | 1 |
| 15 | 4 | 3 | 1 |
| 16 | 5 | 3 | 1 |
| 17 | 0, 1 | 3 | 1 |
| 18 | 2, 3 | 3 | 1 |
| 19 | 4, 5 | 3 | 1 |
| 20 | 0-2 | 3 | 1 |
| 21 | 3-5 | 3 | 1 |
| 22 | 0-3 | 3 | 1 |
| 23 | 0, 2 | 2 | 1 |
| 24 | 0 | 3 | 2 |
| 25 | 1 | 3 | 2 |
| 26 | 2 | 3 | 2 |
| 27 | 3 | 3 | 2 |
| 28 | 4 | 3 | 2 |
| 29 | 5 | 3 | 2 |
| 30 | 6 | 3 | 2 |
| 31 | 7 | 3 | 2 |

FIG.21

| INDEX | PORT NUMBER | NUMBER OF CDM GROUPS NOT INCLUDING DATA | NUMBER OF DMRS SYMBOLS |
|---|---|---|---|
| 32 | 8 | 3 | 2 |
| 33 | 9 | 3 | 2 |
| 34 | 10 | 3 | 2 |
| 35 | 11 | 3 | 2 |
| 36 | 0, 1 | 3 | 2 |
| 37 | 2, 3 | 3 | 2 |
| 38 | 4, 5 | 3 | 2 |
| 39 | 6, 7 | 3 | 2 |
| 40 | 8, 9 | 3 | 2 |
| 41 | 10, 11 | 3 | 2 |
| 42 | 0, 1, 6 | 3 | 2 |
| 43 | 2, 3, 8 | 3 | 2 |
| 44 | 4, 5, 10 | 3 | 2 |
| 45 | 0, 1, 6, 7 | 3 | 2 |
| 46 | 2, 3, 8, 9 | 3 | 2 |
| 47 | 4, 5, 10, 11 | 3 | 2 |
| 48 | 0 | 1 | 2 |
| 49 | 1 | 1 | 2 |
| 50 | 6 | 1 | 2 |
| 51 | 7 | 1 | 2 |
| 52 | 0, 1 | 1 | 2 |
| 53 | 6, 7 | 1 | 2 |
| 54 | 0, 1 | 2 | 2 |
| 55 | 2, 3 | 2 | 2 |
| 56 | 6, 7 | 2 | 2 |
| 57 | 8, 9 | 2 | 2 |
| 58-63 | reserved | reserved | reserved |

TRANSMISSION DEVICE, RECEIVING DEVICE, BASE STATION, TERMINAL, AND TRANSMISSION METHOD

FIELD

The present invention relates to a transmission device that transmits a digital signal, a receiving device, a base station, a terminal, and a transmission method.

BACKGROUND

In a digital communication system, frequency selectivity and time variation of a channel are caused to occur because of multipath fading caused by reflection of a transmission signal from a building or the like or by the Doppler drift caused by movement of a communication device. In a multipath environment where multipath fading occurs, a signal received by a communication device is a signal in which transmission symbols that directly reach from a sender communication device and symbols that are reflected by a building or the like and then reach later interfere with each other.

As for a channel with frequency selectivity, an OFDM (Orthogonal Frequency Division Multiplexing) transmission method, which is multiple carrier (MC) block transmission, is used for obtaining the best receiving characteristics (see, for example, Non Patent Literature 1 listed below).

Further, as a technique for improving communication capacity, there is known an MIMO (Multiple Input Multiple Output) wireless transmission method that uses a plurality of transmission/reception antennas. In the MIMO communication, there are a method of multiplexing transmission layers for improving the communication capacity and a method of multiplexing transmission layers for transmitting signals to each of a plurality of users in parallel. The latter method is referred to as "multi-user MIMO". In the multi-user MIMO, multiple layers for a plurality of users are multiplexed on the transmission side.

Generally, multiplexing of multiple layers is performed on the transmission side by using precoding. Precoding is performed by using a channel estimation value of a channel from the transmission side toward the reception side. Therefore, a communication device on the transmission side generates and transmits a signal in which a reference signal that can be used for channel estimation is inserted so as to enable a communication device on the reception side to perform channel estimation and feedback to the transmission side. The reference signal is also used in demodulation of multiplexed signals. There are several types of reference signals. The standardization body 3GPP ($3^{rd}$ Generation Partnership Project) defines a plurality of reference signals, one of which is a DMRS (Demodulation Reference Signal) and is transmitted having been subjected to a precoding process. Therefore, by using the DMRS, the communication device on the reception side can estimate the precoding process performed on the transmission side and a channel. The DMRS is also referred to as "reference signal for demodulation".

Further, generally, in the multi-user MIMO, a specific reference signal is assigned to each layer and each user. In this case, as a communication device on the reception side uses a reference signal assigned to a layer in which a signal is transmitted to the communication device itself, it is possible to perform channel estimation for the layer and to demodulate a received signal.

CITATION LIST

Non Patent Literature

Non Patent Literature 1: W. Y. Zou and Y. Wu, "COFDM: An overview", IEEE Trans. on Broadcasting, vol. 41, no. 1, March 1995, pp. 1-8.

SUMMARY

Technical Problem

However, each user does not know reference signals assigned to other users. Therefore, when interference occurs between users, that is, when communication of a certain user is subjected to interference with communication of another user, there is a problem that it is not possible to cancel the interference.

The present invention has been achieved in view of the above problems, and an object of the present invention is to provide a transmission device that can improve communication quality.

Solution to Problem

In order to solve the above problems and achieve the object, a transmission device according to the present invention includes an identifier to identify an interfering terminal that is a possible terminal to perform communication that causes interference with communication with a target terminal, which is a destination terminal of a data signal. The transmission device also includes a transmitter to set a group ID for reference signal generation to a group formed by the interfering terminal and the target terminal and to transmit the group ID and information on each terminal belonging to the group to the target terminal.

Advantageous Effects of Invention

The transmission device according to the present invention has an effect where communication quality can be improved.

BRIEF DESCRIPTION OF DRAWINGS

FIG. 5 is a diagram illustrating an example of a table used when the base station according to the first embodiment notifies a terminal of information on a reference signal.

FIG. 17 is a diagram illustrating an example of a port mapping table retained in a base station and a terminal according to the third embodiment.

FIG. 20 is a diagram illustrating the former half of another example of the port mapping table retained in the base station and the terminal according to the third embodiment.

FIG. 21 is a diagram illustrating the latter half of the another example of the port mapping table retained in the base station and the terminal according to the third embodiment.

DESCRIPTION OF EMBODIMENTS

A transmission device, a receiving device, a base station, a terminal, and a transmission method according to embodiments of the present invention will be described in detail below with reference to the accompanying drawings. The present invention is not limited to the embodiments.

First Embodiment

Figure 1:
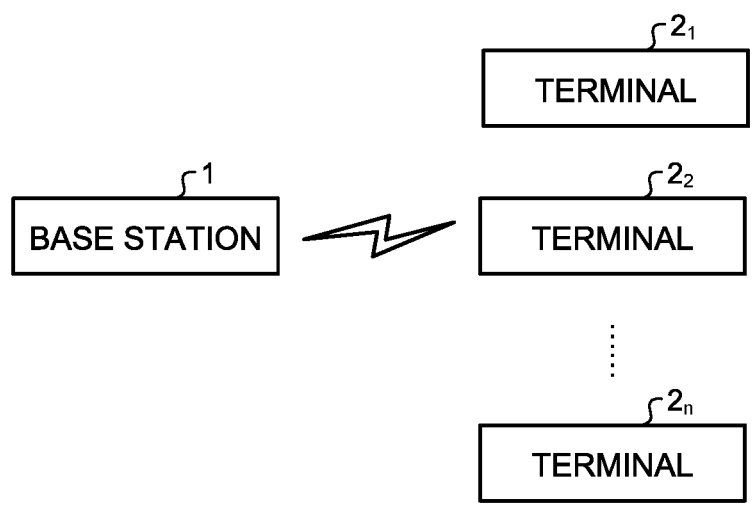
FIG. 1 is a diagram illustrating a configuration example of a wireless communication system according to a first embodiment.

FIG. 1 is a diagram illustrating a configuration example of a wireless communication system according to a first embodiment. The wireless communication system according to the first embodiment includes a base station 1 and a plurality of terminals 2 (terminals $2_1$ to $2_n$).

The terminals 2 are communication devices that are also referred to as "user terminals" or "UE (User Equipment)", and demodulate a signal received from the base station 1 by using a reference signal described later. A channel from the base station 1 to the terminal 2 is referred to as "downlink", and a channel from the terminal 2 to the base station 1 is referred to as "uplink". In the downlink communication, the base station 1 is a transmission device and the terminal 2 is a receiving device. In the uplink communication, the terminal 2 is a transmission device and the base station 1 is a receiving device. The wireless communication system according to the first embodiment uses an OFDM method in the downlink communication.

Figure 2:
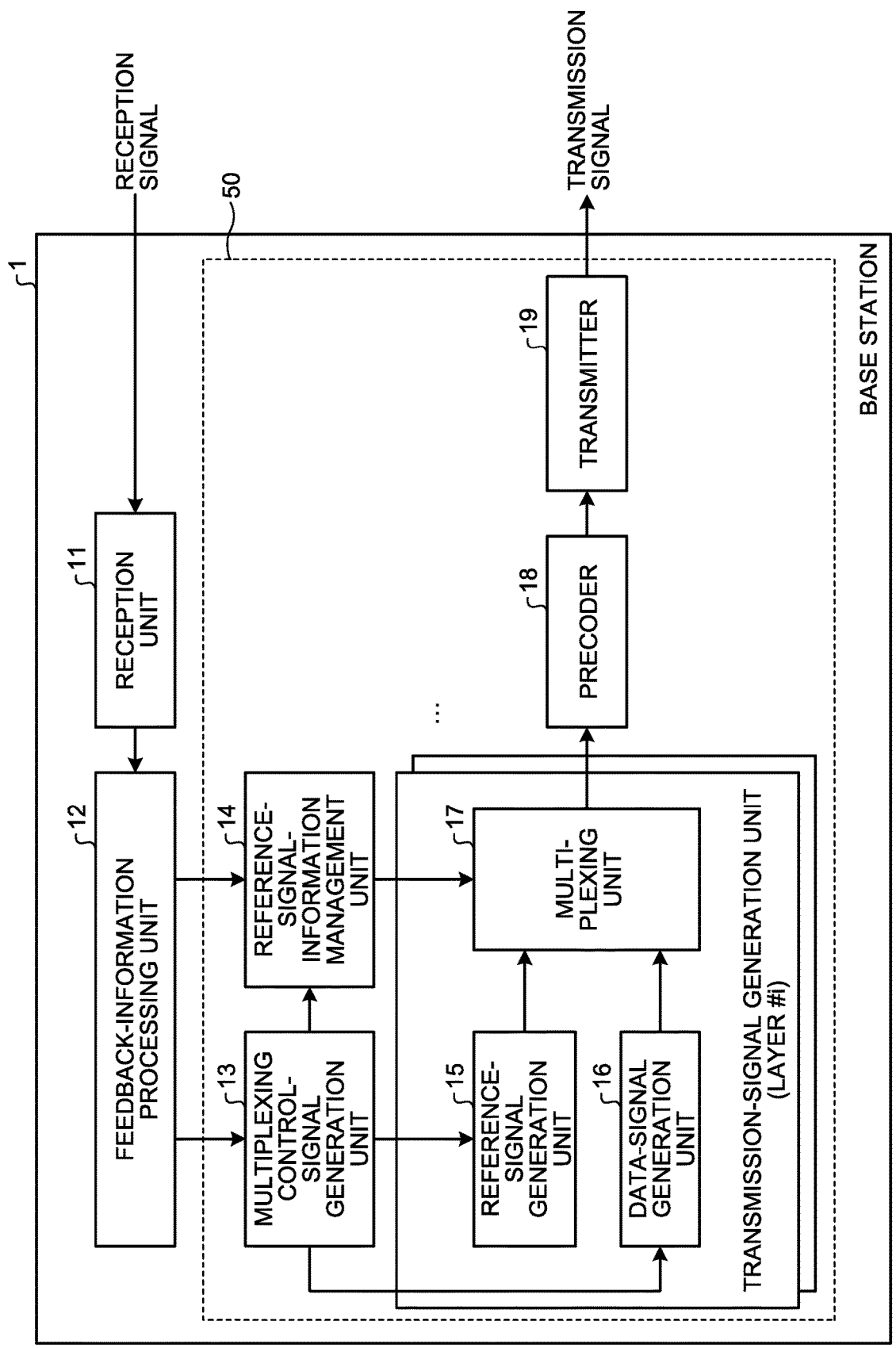
FIG. 2 is a diagram illustrating a configuration example of a base station according to the first embodiment.

FIG. 2 is a diagram illustrating a configuration example of the base station 1 according to the first embodiment. The base station 1 includes a reception unit 11, a feedback-information processing unit 12, a multiplexing control-signal generation unit 13, a reference-signal-information management unit 14, a reference-signal generation unit 15, a data-signal generation unit 16, a multiplexing unit 17, a precoder 18, and a transmitter 19. The multiplexing control-signal generation unit 13, the reference-signal-information management unit 14, the reference-signal generation unit 15, the data-signal generation unit 16, the multiplexing unit 17, the precoder 18, and the transmitter 19 constitute a transmission device 50. The first embodiment assumes a wireless communication system configured to multiplex multiple layers. The layer described here corresponds to an information sequence including one or more of data, a control signal, and a reference signal. Large-capacity transmission is realized by multiplexing multiple layers and transmitting the multiplexed layers. Multiplexing of multiple layers is performed by performing precoding and using MIMO transmission, for example. The reference-signal generation unit 15, the data-signal generation unit 16, and the multiplexing unit 17 illustrated in FIG. 2 constitute a transmission-signal generation unit that performs processing for an information sequence corresponding to a layer number i (a layer #i). That is, the base station 1 includes a plurality of the transmission-signal generation units, and the transmission-signal generation units generate transmission signals of respective layers. Although the first embodiment is described on an assumption that one layer is assigned to one terminal 2, it is merely an example. Multiple layers may be assigned to one terminal 2.

In the base station 1, the transmission-signal generation unit for each layer generates a signal to be transmitted to the corresponding one of the terminals 2, and transmits the signal to the one of the terminals 2 via the precoder 18 and the transmitter 19. That is, in the transmission-signal generation unit for each layer, the reference-signal generation unit 15 generates a reference signal to be used when the terminal 2 performs a signal receiving process including channel estimation and demodulation, for example. The data-signal generation unit 16 generates a data signal to be transmitted to the terminal 2. The multiplexing unit 17 multiplexes the reference signal generated in the reference-signal generation unit 15 and the data signal generated in the data-signal generation unit 16. Multiplexing described here means arranging a reference signal and a data signal in a specific area defined by a time and a frequency. Further, when a control signal including reference signal information described later is input from the reference-signal-information management unit 14, the multiplexing unit 17 multiplexes the input control signal with the reference signal and the data signal.

The precoder 18 performs precoding for a transmission signal generated in the transmission-signal generation unit for each layer. The transmitter 19 performs a transmission process such as a multi-antenna transmission process and a waveform shaping process for a transmission signal having been subjected to precoding in the precoder 18. An OFDM process is an example of the waveform shaping process. In the OFDM process, the transmitter 19 performs IDFT (Inverse Discrete Fourier Transform) and CP (Cyclic Prefix) addition.

The reception unit 11 of the base station 1 receives a signal transmitted from the terminal 2, and performs processing such as demodulation or decoding to restore an information sequence transmitted by the terminal 2. Deciphering of an information sequence transmitted in an uplink is performed by the feedback-information processing unit 12. In the uplink, if its sender is the terminal 2 that has not performed communication yet, that is, the terminal 2 before starting communication, information indicating a communication request, for example, is transmitted to the base station 1. If its sender is the terminal 2 that is performing communication, information such as information indicating a channel state is transmitted to the base station 1. Examples of the channel state are the number of paths in a multipath channel and channel information in multi-antenna communication. A channel in multi-antenna communication can be expressed by a complex matrix. Information corresponding to the channel information in this case is, for example, the maximum number of ranks of the matrix, an eigenvector, or an eigenvalue.

The feedback-information processing unit 12 deciphers the information sequence received from the terminal 2, and when the deciphered information includes channel state information indicating a channel state, the feedback-information processing unit 12 extracts the channel state information and outputs the extracted information to the multiplexing control-signal generation unit 13.

The multiplexing control-signal generation unit 13 generates a control signal for reference signal generation based on the channel state information. As described before, the channel state information corresponds to the maximum number of ranks of a channel matrix in multi-antenna communication, for example. The multiplexing control-signal generation unit 13 determines the number of layers to be multiplexed based on the channel state information, and also determines a reference signal to be used in each of the layers to be multiplexed. The multiplexing control-signal generation unit 13 determines reference signals that are different from each other as the reference signals used in the respective layers to be multiplexed. Also, the multiplexing control-signal generation unit 13 outputs a control signal that instructs a reference signal to be used, that is, a reference signal to be generated to the reference-signal generation unit 15 for each layer. The multiplexing control-signal generation unit 13 may not output a control signal to the reference-signal generation unit 15 for a layer that is not multiplexed. Further, the multiplexing control-signal generation unit 13 outputs information indicating a reference signal to be used in each layer to the reference-signal-information management unit 14. Further, the multiplexing control-signal generation unit 13 outputs a control signal related to a data-signal generating operation to the data-signal generation unit 16 for each layer. The control signal related to a data-signal generating operation is a signal that instructs generation of a data signal. The multiplexing control-signal generation unit 13 outputs a control signal that instructs generation of a data signal to the data-signal generation unit 16 for a layer to be multiplexed. For example, when it is determined that a layer #1 and a layer #2 are multiplexed, the multiplexing control-signal generation unit 13 outputs a control signal that instructs generation of a data signal to the data-signal generation unit 16 for the layer #1 and the data-signal generation unit 16 for the layer #2. The control signal that instructs generation of a data signal may include information for instructing generation of a data signal and also includes other information related to generation of a data signal, for example, the generation amount of the data signal.

Upon reception of information indicating a reference signal to be used in each layer from the multiplexing control-signal generation unit 13, the reference-signal-information management unit 14 holds the information. Further, the reference-signal-information management unit 14 generates a control signal including information on a reference signal to be transmitted to the terminal 2, and outputs the control signal to the multiplexing unit 17 for a layer that transmits the reference signal. For example, it is assumed that the reference-signal-information management unit 14 has received information on a reference signal to be used in the layer #1 and a reference signal to be used in the layer #2 from the multiplexing control-signal generation unit 13. In this case, the reference-signal-information management unit 14 generates a control signal including information on the reference signal to be used in the layer #1 and outputs the signal to the multiplexing unit 17 for the layer #1, and also generates a control signal including information on the reference signal to be used in the layer #2 and outputs the control signal to the multiplexing unit 17 for the layer #2. If there is an interfering terminal with respect to a target terminal described later, the reference-signal-information management unit 14 generates a control signal including information on a reference signal to be transmitted to the target terminal and information on a reference signal to be transmitted to the interfering terminal, and outputs the generated control signal to the multiplexing unit 17 for a layer that transmits a signal to the target terminal. In the following descriptions, "a reference signal to be transmitted to a target terminal" may be described as "a reference signal for a target terminal". Further, "a reference signal to be transmitted to an interfering terminal" may be described as "a reference signal for an interfering terminal". The reference signal to be transmitted to the target terminal is assumed as "first reference signal", and the reference signal to be transmitted to the interfering terminal is assumed as "second reference signal". In this case, the information on the reference signal to be transmitted to the target terminal is information on the first reference signal, and the information on the reference signal to be transmitted to the interfering terminal is information on the second reference signal.

When the control signal output from the reference-signal-information management unit 14 to the multiplexing unit 17 is input to the multiplexing unit 17, it is multiplexed with a reference signal and a data signal, and then transmitted to the terminal 2 via the precoder 18 and the transmitter 19. Transmission of information on a reference signal to the terminal 2 may be performed by any method. Several examples of the method are described below.

Transmission of information on a reference signal from the base station 1 to the terminal 2 can be performed by using an upper layer or a lower layer. A case of using an upper layer corresponds to information transmission using RRC (Radio Resource Control) of a layer 3 (Layer 3) defined in the 3GPP, for example. That is, the base station 1 can transmit information on a reference signal to the terminal 2 while including the information in an RRC message. A case of using a lower layer corresponds to use of a PDCCH (Physical Downlink Control Channel) defined in the 3GPP. In the case of using the PDCCH, information on a reference signal is defined as parameter information, and the base station 1 transmits the information on the reference signal to the terminal 2 as the parameter information while including the information in the PDCCH. The PDCCH is a control channel for transmitting information of a layer 1 (Layer 1). Further, the base station 1 may transmit the information on the reference signal to the terminal 2 by using a MAC (Medium Access Control) layer or the like, that is, a MAC CE (Control Element) transmitted in a layer 2 in the 3GPP. Furthermore, if the information on the reference signal is a parameter that does not change for a long time, it may be transmitted from the base station 1 to the terminal 2, as a control signal in the layer 3 or the layer 2 in the 3GPP. If the information on the reference signal is a parameter that changes in a short time, it suffices to transmit the information by using a control signal for the layer 1 in the 3GPP.

Information on a reference signal managed by the reference-signal-information management unit 14 is different depending on the generating method of the reference signal. An example of the generating method of the reference signal is described. In the method defined in 3GPP LTE, a PN (Pseudo Noise) sequence is generated as a downlink demodulation reference signal (DMRS). The PN sequence generated as the DMRS is determined by an ID of each cell and a scramble ID. That is, in 3GPP LTE, PN sequences that are different depending on these IDs are generated and used. In this case, the reference-signal-information management unit 14 manages the cell ID and the scramble ID as information on a reference signal.

Further, the DMRS is arranged in a resource element (RE) of a time and a frequency that correspond to a specified port number. The RE represents the unit of frequency. In 3GPP LTE, an RE of a group that consists of twelve sub-carriers and seven symbols is referred to as "one resource block (RB)". One symbol in a downlink is an OFDM symbol. The scramble ID and the cell ID are transmitted by DCI (Downlink Control Information) included in a PDCCH, for example. Therefore, a terminal of 3GPP LTE deciphers the PDCCH, thereby being able to acknowledge the method of generating a DMRS for the terminal, that is, a PN sequence used in the DMRS and a port number, that is, the arrangement of the DMRS. Accordingly, the terminal can demodulate a data signal transmitted thereto by using the DMRS assigned thereto.

However, in conventional wireless communication systems represented by 3GPP LTE, each terminal cannot acknowledge reference signals transmitted to other terminals. Therefore, if each terminal has received a signal subjected to interference from a signal transmitted to other terminals from a base station, it is not possible to estimate the interference component included in the received signal.

Meanwhile, in the wireless communication system according to the first embodiment, the base station 1 transmits information on the reference signals for other terminals to each of the terminals 2. Therefore, each terminal 2 can acknowledge the reference signal for the other terminal, and can suppress the interference component included in a signal transmitted to the terminal 2 by using the reference signal for the other terminal. If there is the downlink communication of a terminal 2 that interferes with the downlink communication of another terminal 2, the base station 1 transmits information on a reference signal directed to the terminal 2 that interferes, to the terminal 2 that is subjected to interference. In the following descriptions, for convenience, a terminal subjected to interference is described as "target terminal" and a terminal that interferes with the target terminal is described as "interfering terminal".

In order for the base station 1 to notify a target terminal of information of a reference signal for an interfering terminal, it is necessary to know whether the target terminal is in a state where the target terminal is subjected to interference with another terminal 2. Therefore, upon reception of a notification from the target terminal, the base station 1 identifies the interfering terminal and transmits information on the interfering terminal, that is, information on a reference signal directed to the target terminal, to the target terminal. It is determined whether the terminal 2 requires to acknowledge the information on the interfering terminal based on whether the terminal 2 has an interference cancellation function. It is desirable that the base station 1 does not notify terminals 2 that do not have the interference cancellation function of the information related to the interfering terminal in order to effectively use communication resources and to prevent erroneous operations, for example. Further, although efficiency is lowered, it is also possible to notify all users of reference signal information of all the users to which signal transmission is performed simultaneously, in order to simplify procedures.

An example of a method of identifying an interfering terminal with respect to a target terminal by the base station 1 is described. The method of identifying an interfering terminal is not limited to the following example. In the first embodiment, it is assumed that identification of the interfering terminal with respect to the target terminal is performed by the reference-signal-information management unit 14. That is, the reference-signal-information management unit 14 operates as an identifier to identify an interfering terminal that is a possible terminal to perform communication that causes interference with communication with the target terminal, which is a destination terminal of a data signal.

(1) Method of Identifying Interfering Terminal Based on Terminal-to-Terminal Distance.

The base station 1 can recognize a positional relation between terminals 2 by causing each of the terminals 2 to feed back positional information. The positional information is information on the longitude and the latitude, for example, and the terminal 2 acquires the positional information by using a GPS (Global Positioning System) and the like. Generally, it is considered that it is difficult to spatially separate terminals that are close to each other, and this difficulty results in interference. The base station 1 calculates a distance between a target terminal and other terminals 2, and determines that the terminal 2 having a distance equal to or smaller than a threshold is an interfering terminal.

(2) Method of Identifying Interfering Terminal Based on Information on Beam Captured by Terminal.

The base station 1 that performs communication with a narrow beam regularly performs beam scanning on the entire cell area in order to detect occurrence of a new user. At this time, predetermined positions are irradiated with the beam. Therefore, the base station 1 can acknowledge a rough position of each terminal 2 by acknowledging a beam having been received by the terminal 2 at the maximum power. The base station 1 can recognize a positional relation among the terminals 2 by causing each terminal 2 to feed back information on a beam with the maximum reception power. The beam information to be fed back is identification information of the beam. In addition to the identification information of the beam, the reception power may be also fed back. The base station 1 determines that the terminal 2 present in a beam close to a beam in which the target terminal is located is the interfering terminal. If time synchronization is established between the base station 1 and each terminal 2, the information fed-back by the terminal 2 to the base station 1 may be information of a time at which the maximum reception power of a beam is detected. In this case, the base station 1 compares a time at which the target terminal detects the maximum reception power with a time at which another terminal 2 detects the maximum reception power, and determines that the terminal 2 having a time difference equal to or smaller than a threshold is the interfering terminal.

(3) Method of Identifying Interfering Terminal Based on Spatial Correlation.

Channel information (CSI: Channel State Information) between the base station 1 and the terminal 2 is important when beam forming is performed. Generally, the base station 1 can acquire channel information by using an uplink acknowledgement signal that uses reciprocity or reversibility of channels, or can acquire channel information by explicit feedback from the terminal 2. Examples of the explicit feedback are a complex channel matrix, an eigenvector, and an eigenvalue. The reversibility of channels means an environment that is assumed that an uplink channel and a downlink channel are the same as each other. If the reversibility of channels is established, the base station 1 can acknowledge a downlink channel by performing channel estimation using a reference signal transmitted in an uplink. Therefore, it is no longer necessary to receive feedback of channel information of a downlink from the terminal 2. The base station 1 can calculate spatial correlation between the target terminal and another terminal 2 based on the channel information. The base station 1 determines that the terminal 2 having the highest spatial correlation with the target terminal is the interfering terminal.

It is also expected that there are a plurality of interfering terminals with respect to a target terminal. In this case, it is possible to configure that the base station 1 sets thresholds that have different units with respect to the distance, the correlation value, and the like, respectively, handles the terminal 2 having a distance shorter than the threshold or a correlation value higher than the threshold value as the interfering terminal, and transmits information on a reference signal of each interfering terminal to the target terminal.

Further, the number of interfering terminals for which the terminal 2 can cancel interference is limited. Therefore, the base station 1 transmits, to the target terminal, information on reference signals of terminals, the number of which is the number of terminals that can be handled. In this case, if the base station 1 identifies the interfering terminal by the method (1) described above, the base station 1 selects terminals having the shortest distances, the number of which is the number of terminals the target terminal can handle, as the interfering terminals in sequence. Similarly, if the base station 1 identifies the interfering terminal by the method (3) described above, the base station 1 selects terminals having the highest correlation values, the number of which is the number of terminals the target terminal can handle, as the interfering terminals in sequence. The base station 1 transmits information on reference signals of the selected interfering terminals to the target terminal.

Figure 3:
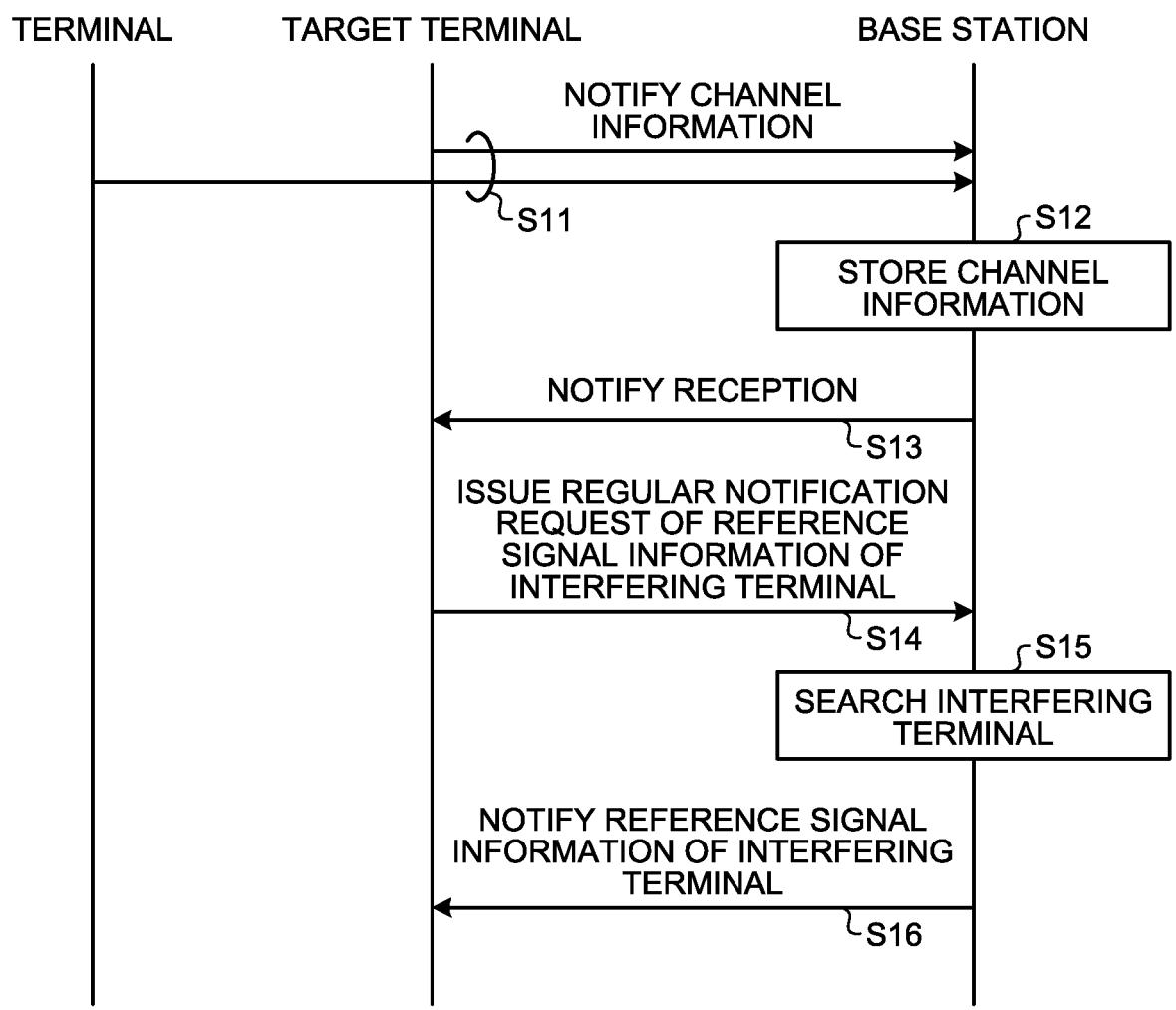
FIG. 3 is a sequence diagram illustrating an operation example of the wireless communication system according to the first embodiment.

FIG. 3 is a sequence diagram illustrating an operation example of the wireless communication system according to the first embodiment. Although the number of terminal 2 other than a target terminal is one in FIG. 3, the number of the terminals 2 may be two or more in some cases. The target terminal is any one of the plurality of terminals 2. First, in the wireless communication system according to the first embodiment, all the terminals 2 including the target terminal notify the base station 1 of channel information (Step S11), and the base station 1 stores therein the channel information notified from each terminal 2 (Step S12). The base station 1 then transmits a reception notification to the target terminal (Step S13). The base station 1 transmits the reception notification to the target terminal, for example, upon reception of the channel information notified from the terminal 2 other than the target terminal. Transmission of the reception notification is performed in a configuration in which the channel information is irregularly notified from each terminal 2. When the channel information is regularly notified from each terminal 2, it is not necessary to transmit the reception notification from the base station 1 to the target terminal. Thereafter, the target terminal transmits a request of reference signal information of an interfering terminal to the base station 1 (Step S14), and the base station 1 having received this request searches the interfering terminal, that is, the base station 1 identifies which of the terminals 2 other than the target terminal is the interfering terminal (Step S15). The base station 1 identifies the interfering terminal by using any of the methods (1) to (3) described above or another method. After identifying the interfering terminal, the base station 1 notifies the target terminal of the reference signal information of the interfering terminal (Step S16). If there is no interfering terminal, the base station 1 does not perform Step S16. The target terminal cancels a component of interference from communication between the base station 1 and the interfering terminal, from a reception signal based on the reference signal information received from the base station 1. The target terminal may perform Step S14, that is, request of the reference signal information of the interfering terminal when a predetermined condition has been satisfied, for example, when an occurrence frequency of a reception error has reached a defined value. Further, it may be also possible that Step S15 is omitted in order to simplify procedures, and all users are notified of reference signal information of all users to which signals are transmitted simultaneously.

In this example, all the terminals 2 in the wireless communication system can become a target terminal. Therefore, the base station 1 stores therein the channel information at Step S12 and thereafter transmits the reception notification to all the terminals 2 that are performing communication. Thereafter, upon reception of the request of the reference signal information of the interfering terminal, the base station 1 performs Steps S15 and S16 for the terminal 2 that is a sender of the request.

Figure 4:
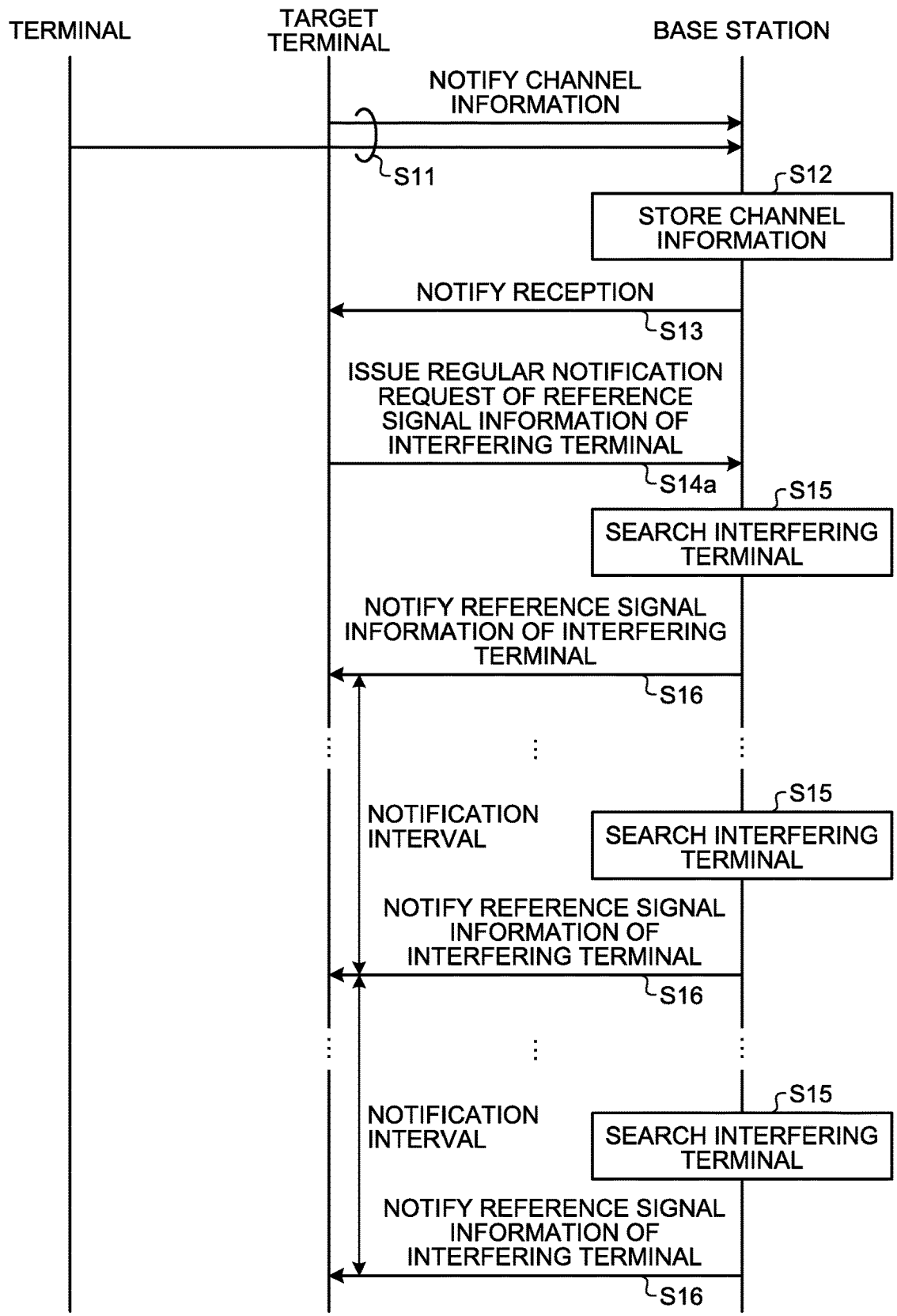
FIG. 4 is a sequence diagram illustrating another operation example of the wireless communication system according to the first embodiment.

FIG. 3 illustrates a sequence in which the base station 1 sends information on a reference signal of an interfering terminal in response to a request from a target terminal. Although an irregular notification is performed in the sequence in FIG. 3, the base station 1 may issue a notification regularly. In this case, the sequence illustrated in FIG. 4 is performed. FIG. 4 is a sequence diagram illustrating another operation example of the wireless communication system according to the first embodiment. In the operation in accordance with the sequence illustrated in FIG. 4, after performing Steps S11 to S13 illustrated in FIG. 3, a target terminal transmits a regular notification request of reference signal information of an interfering terminal to the base station (Step S14a). The base station 1 having received the request at Step S14a performs Steps S15 and S16 described above to search the interfering terminal and to notify the target terminal of the information on a reference signal of the interfering terminal. Thereafter, the base station 1 regularly performs Steps S15 and S16. That is, the base station 1 repeats Steps S15 and S16 each time a certain time corresponding to a notification interval illustrated in FIG. 4 has passed. Regular execution of Steps S15 and S16 may be ended when a predetermined time has passed, when Steps S15 and S16 have been repeated a predetermined number of times, or when an end request has been received from the target terminal. Further, the base station 1 may end regular execution of Steps S15 and S16 when it no longer receives a signal from the target terminal. Although illustrations thereof are omitted in FIG. 4, the base station 1 receives channel information from all the terminals 2 including the target terminal in each of certain periods.

The regular notification request transmitted from the target terminal at Step S14a may include information on an interval with which the base station 1 notifies the information on the reference signal of the interfering terminal. Further, the regular notification request from the target terminal may include information indicating cancellation of the regular notification or information on the number of regular notifications.

The information on the reference signal from the base station 1 to the target terminal is generation information of the reference signal that is used by the interfering terminal in a reception process and the position of the reference signal. The generation information relates to the configuration of the reference signal, that is, the contents of the reference signal.

In 3GPP LTE, when a base station notifies a terminal as a communication counterpart of information on a reference signal used in a data reception process, the base station uses the number in a DCI table defined in the 3GPP. Therefore, when the base station 1 is the base station in 3GPP LTE, the base station 1 may notify each target terminal of information on a reference signal of an interfering terminal by using the number in the DCI table.

FIG. 5 is a diagram illustrating an example of a table used when the base station 1 according to the first embodiment notifies the terminal 2 of information on a reference signal. The table illustrated in FIG. 5 is a DCI table to be used in notification of a DMRS defined in the literature "3GPP TS 36.212 V14.0.0".

In transmission of information on a reference signal performed by using the DCI table illustrated in FIG. 5, a value is selected from options in left and right columns, that is, "Value", in accordance with the number of codewords to be used, and the selected value is transmitted on a PDCCH. In a case of performing two-layer multiplexing in transmission of two codewords, for example, when "1" is selected from the right column, by using port numbers 7 and 8, the base station 1 notifies the terminal 2 of transmission of a DMRS corresponding to a scramble ID of 1, that is, $n_{SCID}=1$. In this case, the terminal 2 can acknowledge that a DMRS with a pattern corresponding to $n_{SCID}=1$ is inserted at positions corresponding to the port numbers 7 and 8, and can demodulate a signal transmitted from the base station 1. In the DCI table illustrated in FIG. 5, OCC indicates an orthogonal cover code, and indicates an orthogonal code that is multiplied by a DMRS for performing layer separation. The OCC corresponding to the port numbers 7 and 8 is determined in advance, and thus, as far as the port number is recognized on the reception side, a corresponding OCC can be generated.

Figure 6:
FIG. 6 is a diagram illustrating a configuration example of a control channel in a case where the base station according to the first embodiment notifies a target terminal of information on a reference signal of an interfering terminal.

FIG. 6 illustrates a configuration example of a PDCCH in a case where the base station 1 notifies a target terminal of information on a reference signal of an interfering terminal by using the number in a DCI table. As illustrated in FIG. 6, the PDCCH includes "target-terminal value" that is a value in the DCI table, as information on a reference signal of the target terminal, and further includes "interfering-terminal value" that is a value in the DCI table, as information on a reference signal of the interfering terminal. The information on the reference signal of the target terminal is information on the first reference signal, and the information on the reference signal of the interfering terminal is information on the second reference signal. In FIG. 6, illustrations of other pieces of information included in the PDCCH are omitted. Further, it is not necessary that the value for the target terminal and the value for the interfering terminal are arranged continuously. Information included in the PDCCH may be subjected to error correction coding.

Figure 7:
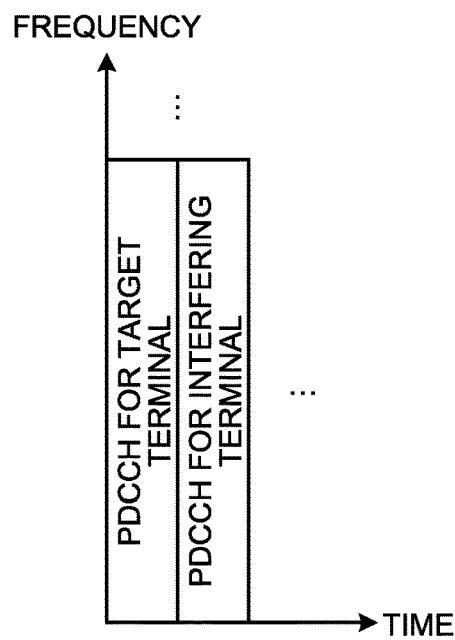
FIG. 7 is a diagram illustrating a configuration example of a control channel in a case where the base station according to the first embodiment transmits information on a reference signal of a target terminal and information on a reference signal of an interfering terminal while these pieces of information are divided into a plurality of symbols.

Further, the information on the reference signal of the target terminal and the information on the reference signal of the interfering terminal may be transmitted while these pieces of information are divided into a plurality of symbols. In a case where transmission of these pieces of information is performed on a PDCCH, for example, reference signal information corresponding to the target terminal is included in a PDCCH to be sent first, and reference signal information of the interfering terminal is included in a PDCCH to be sent next. An arrangement example of the PDCCHs in this case is illustrated in FIG. 7.

Figure 8:
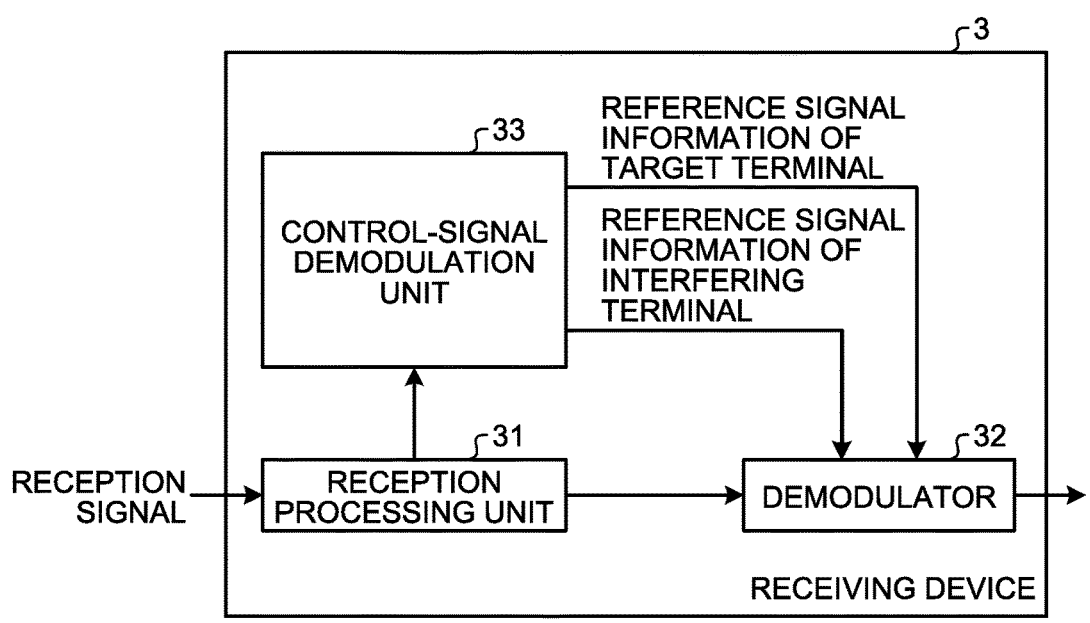
FIG. 8 is a diagram illustrating a configuration example of a receiving device according to the first embodiment.

Next, a receiving terminal according to the first embodiment is described. FIG. 8 is a diagram illustrating a configuration example of a receiving device according to the first embodiment. A receiving device 3 illustrated in FIG. 8 constitutes the terminal 2 illustrated in FIG. 1, and receives a signal transmitted from the base station 1.

The receiving device 3 includes a reception processing unit 31, a demodulator 32, and a control-signal demodulation unit 33. The reception processing unit 31 performs a reception process for a reception signal in accordance with an applied modulation method. For example, in a case where the modulation method is OFDM, the reception processing unit 31 performs processing such as CP removal and frequency domain transformation, and then outputs a control signal to the control-signal demodulation unit 33 and outputs a data signal to the demodulator 32.

The control-signal demodulation unit 33 demodulates the control signal to restore information on the reference signal of the target terminal and information on the reference signal of the interfering terminal that have been described above. The control-signal demodulation unit 33 outputs these pieces of the restored information to the demodulator 32.

The demodulator 32 performs channel estimation or performs demodulation for every layer. At this time, the demodulator 32 uses the information on the reference signal of the target terminal and the information on the reference signal of the interfering terminal having been input from the control-signal demodulation unit 33. The information on the reference signal of the target terminal is information on the first reference signal, and the information on the reference signal of the interfering terminal is information on the second reference signal. As described above, a reference signal of the target terminal is a reference signal used in demodulation of a signal transmitted to the target terminal, and the reference signal of the interfering terminal is a reference signal used in a process of canceling the interference component included in a reception signal. Therefore, the demodulator 32 demodulates the data signal based on the information on the first reference signal, and cancels the interference component included in the data signal based on the information on the second reference signal. Specifically, first, in a demodulation process for every layer, the demodulator 32 generates a reference signal directed to the target terminal based on the information on the reference signal of the target terminal, and generates a reference signal directed to the interfering terminal based on the information on the reference signal of the interfering terminal. The demodulator 32 demodulates a data signal by using the reference signal directed to the target terminal, estimates an interference wave from the interfering terminal based on the reference signal directed to the interfering terminal, and cancels the interference component included in the data signal by using the estimated interference wave. Cancelling of the interference component can be performed by using an IRC (Interference Rejection Combining) method and the like.

While the demodulator 32 that demodulates a data signal and the control-signal demodulation unit 33 that demodulates a control signal are separate configurations in the example illustrated in FIG. 8, these configurations may be constituted as one configuration. For example, the demodulator 32 may demodulate both the data signal and the control signal. In this case, the demodulator 32 demodulates the control signal first, and acquires information on the reference signal of the target terminal and information on the reference signal of an interfering terminal. Subsequently, the demodulator 32 generates the reference signal directed to the target terminal and the reference signal directed to the interfering terminal by using the information on each reference signal acquired by demodulating the control signal, and demodulates the data signal by using the generated reference signals.

Figure 9:
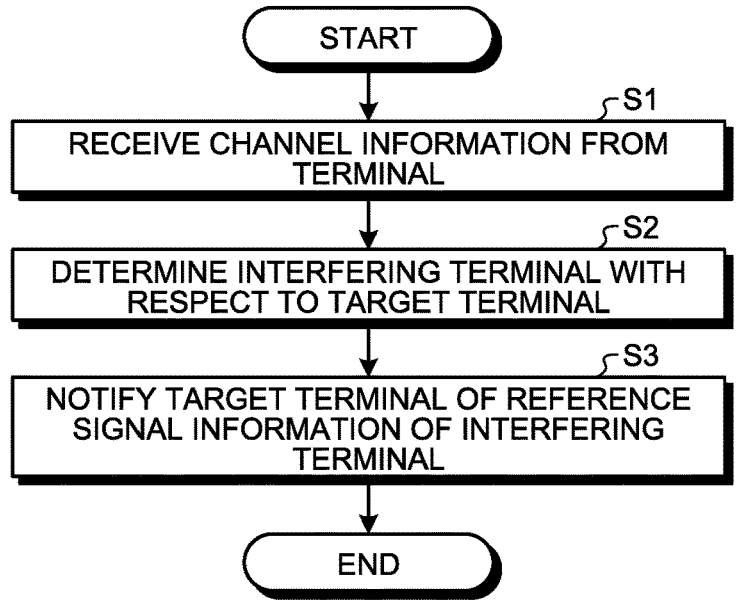
FIG. 9 is a flowchart illustrating an operation example of the base station according to the first embodiment.

FIG. 9 is a flowchart illustrating an operation example of the base station 1 according to the first embodiment, which illustrates an operation example in a case of transmitting information on a reference signal of an interfering terminal to a target terminal.

As illustrated in FIG. 9, the base station 1 receives channel information from the terminal 2 (Step S1). At Step S1, the base station 1 receives channel information from all the terminals 2. The base station 1 then determines an interfering terminal with respect to a target terminal (Step S2). At Step S2, with regard to all the terminals 2, the base station 1 determines the interfering terminal when each terminal 2 is assumed as the target terminal. That is, the base station 1 determines the interfering terminal for each terminal 2. The base station 1 then notifies the target terminal of information on a reference signal of the interfering terminal (Step S3). Normally, there are a plurality of target terminals, and the base station 1 transmits the information on the reference signal of the interfering terminal to each of the target terminals at Step S3.

As described above, in the wireless communication system according to the first embodiment, upon reception of channel information from each of the terminals 2, the base station 1 determines an interfering terminal with regard to each of the terminals 2 when the corresponding terminal 2 is assumed as a target terminal, and identifies the interfering terminal with respect to the target terminal. The base station 1 then notifies each terminal 2 of information on a reference signal of the interfering terminal, that is, information on the reference signal to be transmitted to the interfering terminal. With this process, the terminal 2 can calculate the interference component included in a reception signal based on the information on the reference signal of the interfering terminal, thereby being able to cancel the interference component from the reception signal. Accordingly, it is possible to improve communication quality.

Next, a hardware configuration of the base station 1 according to the first embodiment is described. The constituent elements constituting the base station 1 illustrated in FIG. 2 are respectively constituted by a circuit. Each of the constituent elements constituting the base station 1 illustrated in FIG. 2 may be implemented as a dedicated circuit or a circuit using a processor.

Figure 10:
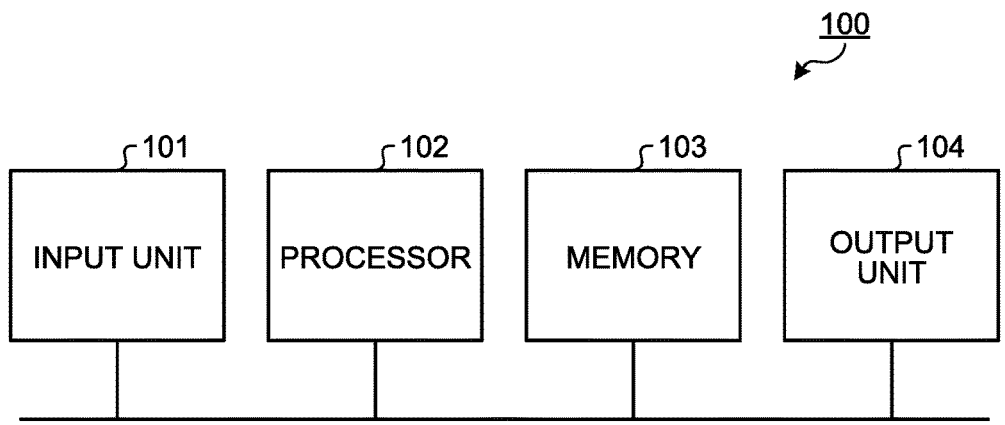
FIG. 10 is a diagram illustrating a configuration example of a control circuit that is used in a case of implementing constituent elements of the base station according to the first embodiment by software.

Among the constituent elements of the base station 1 illustrated in FIG. 2, each of the constituent elements implemented by software is implemented by a control circuit illustrated in FIG. 10, for example. FIG. 10 is a diagram illustrating a configuration example of a control circuit 100 that is used in a case of implementing the constituent elements of the base station 1 according to the first embodiment by software. As illustrated in FIG. 10, the control circuit 100 includes an input unit 101 as a reception unit that receives data input thereto from outside, a processor 102, a memory 103, and an output unit 104 as a transmitter that transmits data to outside. The input unit 101 is an interface circuit that receives data input thereto from outside of the control circuit 100 and provides the data to the processor 102, and the output unit 104 is an interface circuit that sends data from the processor 102 or the memory 103 to outside of the control circuit 100. In a case where at least a part of the constituent elements illustrated in FIG. 2 is implemented by the control circuit 100 illustrated in FIG. 10, the part is implemented by reading and execution of a program stored in the memory 103 by the processor 102, the program corresponding to each constituent element implemented by software. Further, the memory 103 is used as a temporary memory in each process performed by the processor 102.

The processor 102 is a device such as a CPU (Central Processing Unit, also referred to as a central processor, a processing device, a calculation device, a microprocessor, a microcomputer, a processor, and a DSP (Digital Signal Processor)). The memory 103 corresponds to a device, for example, a nonvolatile or volatile semiconductor memory such as a RAM (Random Access Memory), a ROM (Read Only Memory), a flash memory, an EPROM (Erasable Programmable Read Only Memory), and an EEPROM (Electrically Erasable Programmable Read Only Memory), a magnetic disk, a flexible disk, an optical disk, a compact disk, a mini disk, and a DVD (Digital Versatile Disk).

Figure 11:
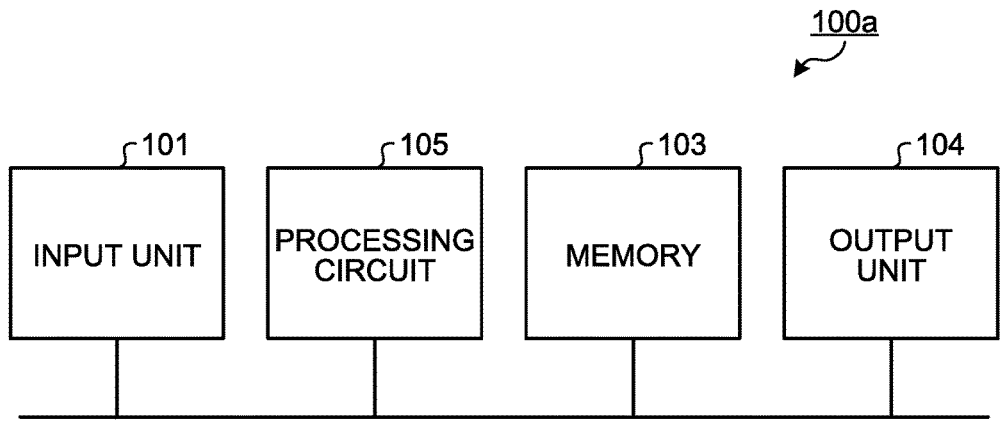
FIG. 11 is a diagram illustrating a configuration example of a dedicated circuit that is used in a case of implementing constituent elements of the base station according to the first embodiment by dedicated hardware.

Among the constituent elements of the base station 1, each of the constituent elements implemented as a dedicated circuit is implemented by a circuit illustrated in FIG. 11, for example. FIG. 11 is a diagram illustrating a configuration example of a dedicated circuit 100a that is used in a case of implementing the constituent elements of the base station 1 according to the first embodiment by dedicated hardware. As illustrated in FIG. 11, the dedicated circuit 100a corresponds to the control circuit 100 illustrated in FIG. 10 with the processor 102 being replaced with a processing circuit 105. The processing circuit 105 is, for example, a single circuit, a composite circuit, a programmed processor, a parallel programmed processor, an ASIC (Application Specific Circuit), an FPGA (Field Programmable Gate Array), or a combination of these elements.

The terminal 2 can be also implemented by similar hardware. Further, a base station and terminals described in a second embodiment can be also implemented by similar hardware.

Second Embodiment

In the first embodiment, the base station 1 transmits information on a reference signal of an interfering terminal to a target terminal, and the target terminal cancels the interference component included in a reception signal based on the information on the reference signal of the interfering signal. In this case, if there are many interfering terminals, the amount of control signals is increased and the amount of data that can be transmitted is reduced. Therefore, it is desirable to minimize the transmission amount of control signals.

Therefore, in the second embodiment, there is described a base station that can transmit information on reference signals of a plurality of interfering terminals to a target terminal while suppressing the transmission amount of control signals. The configuration of a wireless communication system is identical to that in the first embodiment. The configuration of a base station is also identical to that in the first embodiment. In the second embodiment, differences from the first embodiment are described. For convenience of description, a base station according to the second embodiment is referred to as "base station 1a" in order to be distinguished from the base station 1 according to the first embodiment. Similarly, a terminal according to the second embodiment is referred to as "terminal 2a".

The base station 1a according to the second embodiment puts a target terminal and an interfering terminal into a group, and transmits information described below to the target terminal as information related to a reference signal of the interfering terminal. The base station 1a may generate reference signals that are different between terminals, by group-by-group. That is, in some cases, the base station 1a may operate to transmit mutually different reference signals to respective terminals belonging to the same group, and may operate to transmit the same reference signal to terminals that respectively belong to different groups. Further, in the 3GPP, a DMRS as a reference signal is defined to have a different initial value depending on a cell ID. However, a group ID that is finer than the cell ID may be defined and the initial value of the DMRS may be different depending on the group ID. The base station 1a according to the second embodiment uses the group ID in place of the cell ID, when generating the DMRS as the reference signal.

Further, the base station 1a generates a group based on channel information acquired from each terminal 2a. The criterion of grouping is that, by using the positional information or the correlation information described in the first embodiment, the terminals 2a that interfere with a target terminal, that is, interfering terminals, are put into the same group.

A group generation method will be described. With regard to a distance or correlation information between a target terminal and another terminal 2a calculated from positional information, for example, the base station 1a sets a threshold having the unit that is different between the distance and the correlation information. Subsequently, the terminal 2a with a distance shorter than the threshold or the terminal 2a with a correlation value higher than the threshold is put into the same group as the target terminal. Although a cell is a unit within a predetermined range, a group determined by the base station 1a is made adaptively and thus it is a different unit from the cell.

Further, in a case of notifying the target terminal of the information on the reference signal of the interfering terminal, the base station 1a notifies the target terminal of a group ID and the number of group members as the information on the reference signal of the interfering terminal. The number of group members is the number of the terminals 2a included in a group with the notified group ID. For example, the group generation described above is performed by the reference-signal-information management unit 14. In this case, the reference-signal-information management unit 14 of the base station 1a has a function as a group generation unit in addition to the function of the reference-signal-information management unit 14 of the base station 1 according to the first embodiment.

Upon reception of a notification of the group ID and the number of group members, the target terminal searches candidate DMRSs that are expected from the group ID and the number of group members having been notified in all DMRSs, and estimates interference from the interfering terminal. As described above, DMRSs are determined by a cell ID and a scramble ID. However, the target terminal generates DMRSs by using the notified group ID, in place of the cell ID. Although the scramble ID is not notified from the base station 1a, it is selected from some predetermined patterns to be used. Therefore, the target terminal combines all the scramble IDs and the group ID with each other to generate all possible DMRSs, and estimates interference from the interfering terminal. Because the position of insertion of a DMRS is determined, the target terminal identifies a DMRS used for estimation of interference from the interfering terminal by obtaining correlation between a signal received at the position of insertion of the DMRS and each of the generated DMRSs. In this identification, the target terminal identifies the same number of DMRSs as the notified number of group members.

The number of terminals included in each group described above, that is, the maximum number of group members may be fixed. In this case, the base station 1a may only notify the group ID without notifying the number of group members. The maximum number of accommodated terminals in one group may be notified from the base station 1a to the terminal 2a via an upper layer or the like, or a preset value for the maximum number may be continuously used. Further, the maximum number of accommodated terminals in one group may be defined by standards to allow a defined number to be used.

Further, the numbers specific to terminals in a group may be respectively assigned thereto, and the base station 1a may generate a group and transmit the numbers assigned to the respective terminals 2a in the group to the target terminal. In the following descriptions, the number assigned to a terminal is referred to as "group member ID". The group member ID may be a value specific to each group, or may be common to different groups. In a case of assigning group member IDs to respective terminals, the base station 1a generates a reference signal to be transmitted to each terminal by using a group ID and a group member ID assigned to the terminal.

Here, a generation method of a DMRS in conventional 3GPP LTE is described. An initial value for random-number generation that is required for generating a PN sequence used as a DMRS is defined by a literature "3GPP TS 36.212 V14.0.0" and is expressed by the following expression (1).

[Expression 1]

$$c_{init}=(\lfloor n_s/2 \rfloor+1) \cdot (2n_{ID}^{(nSCID)}+1) \cdot 2^{16}+n_{SCID} \quad (1)$$

In the expression (1), $n_{SCID}$ is 0 or 1, and is transmitted by DCI from the base station 1a to the terminal 2a. $n_{SCID}$ is referred to as "scramble ID". A cell ID received from an upper layer is set to a value expressed by the expression (2).

[Expression 2]

$$n_{ID}^{(nSCID)} \quad (2)$$

In this manner, the conventional 3GPP LTE uses a scramble ID and a cell ID in generation of a DMRS.

On the other hand, in the wireless communication system according to the second embodiment, the group ID described above is used in generation of a DMRS in place of the cell ID expressed by the expression (2). The group ID may be adaptively set. In a case where the group ID is adaptively set, a set value of the group ID is transmitted from the base station 1a to the terminal 2a by using a PDCCH. Further, a group member ID may be used as $n_{SCID}$ in the expression (1). That is, the group member ID may be used in generation of a DMRS, in place of a conventional scramble ID. Initialization of a PN sequence in generation of a DMRS is not limited to a method performed in accordance with the expression (1). Initialization may be performed by another method.

Figure 12:
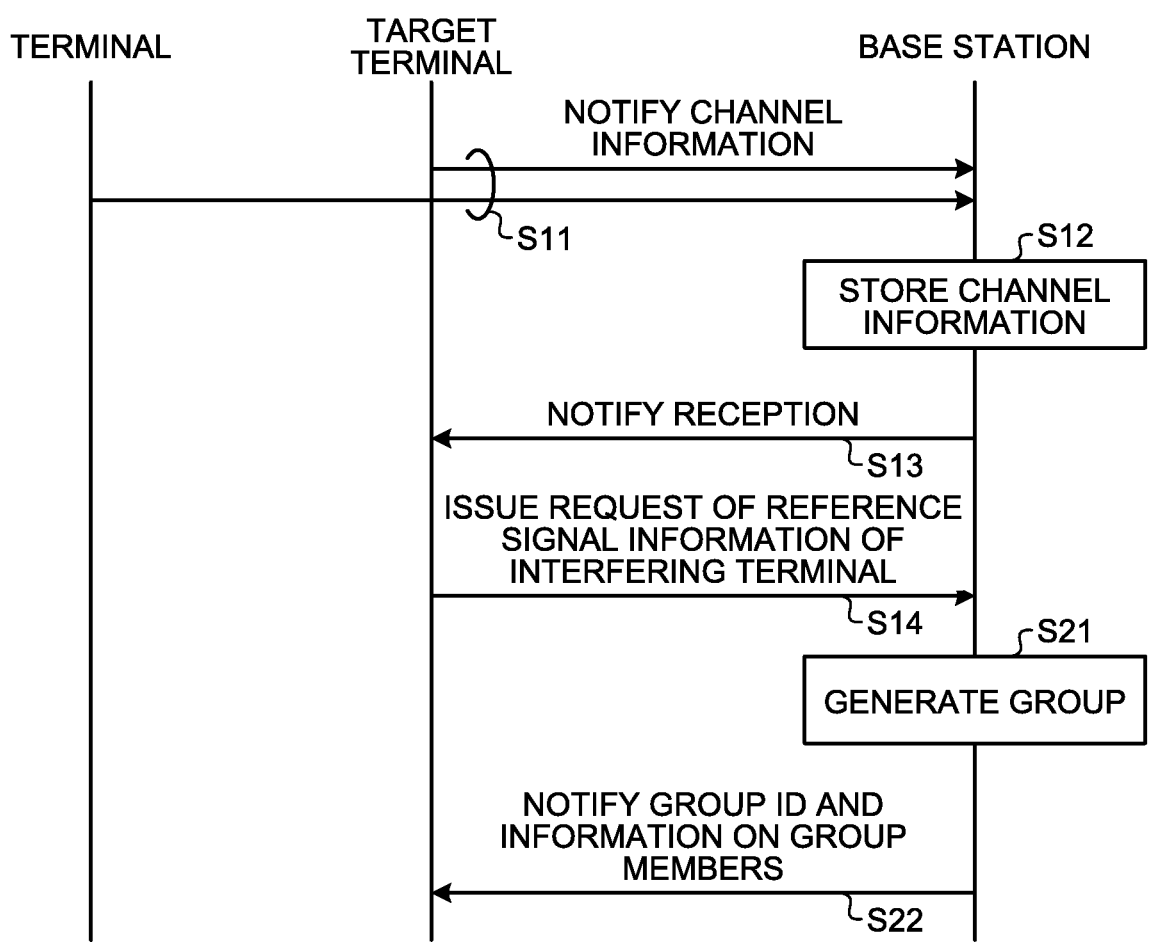
FIG. 12 is a sequence diagram illustrating an operation example of a wireless communication system according to a second embodiment.

FIG. 12 is a sequence diagram illustrating an operation example of a wireless communication system according to the second embodiment. Although the number of the illustrated terminals 2a other than a target terminal is one in FIG. 12, the number of the terminals 2a is two or more in some cases. The target terminal is any one of the terminals 2a.

In the wireless communication system according to the second embodiment, the base station 1a collects channel information from each terminal 2a and stores the information therein (Steps S11 and S12), and transmits a reception notification to the target terminal (Step S13). Thereafter, the base station 1a receives a request of reference signal information of an interfering terminal from the target terminal (Step S14). The processes at Step S11 to S14 are the same as the processes at Steps S11 to S14 in FIG. 3 described in the first embodiment. The base station 1a having received the request of the reference signal information of the interfering terminal generates a group including the target terminal, that is, a group including the target terminal and the interfering terminal by the method described above (Step S21). The base station 1a then notifies the target terminal of a group ID and information on group members of the generated group (Step S22). The information on group members is the number of group members, that is, the number of the interfering terminals. In a case where the maximum number of group members has been determined already, it is not necessary to transmit the information on group members.

Figure 13:
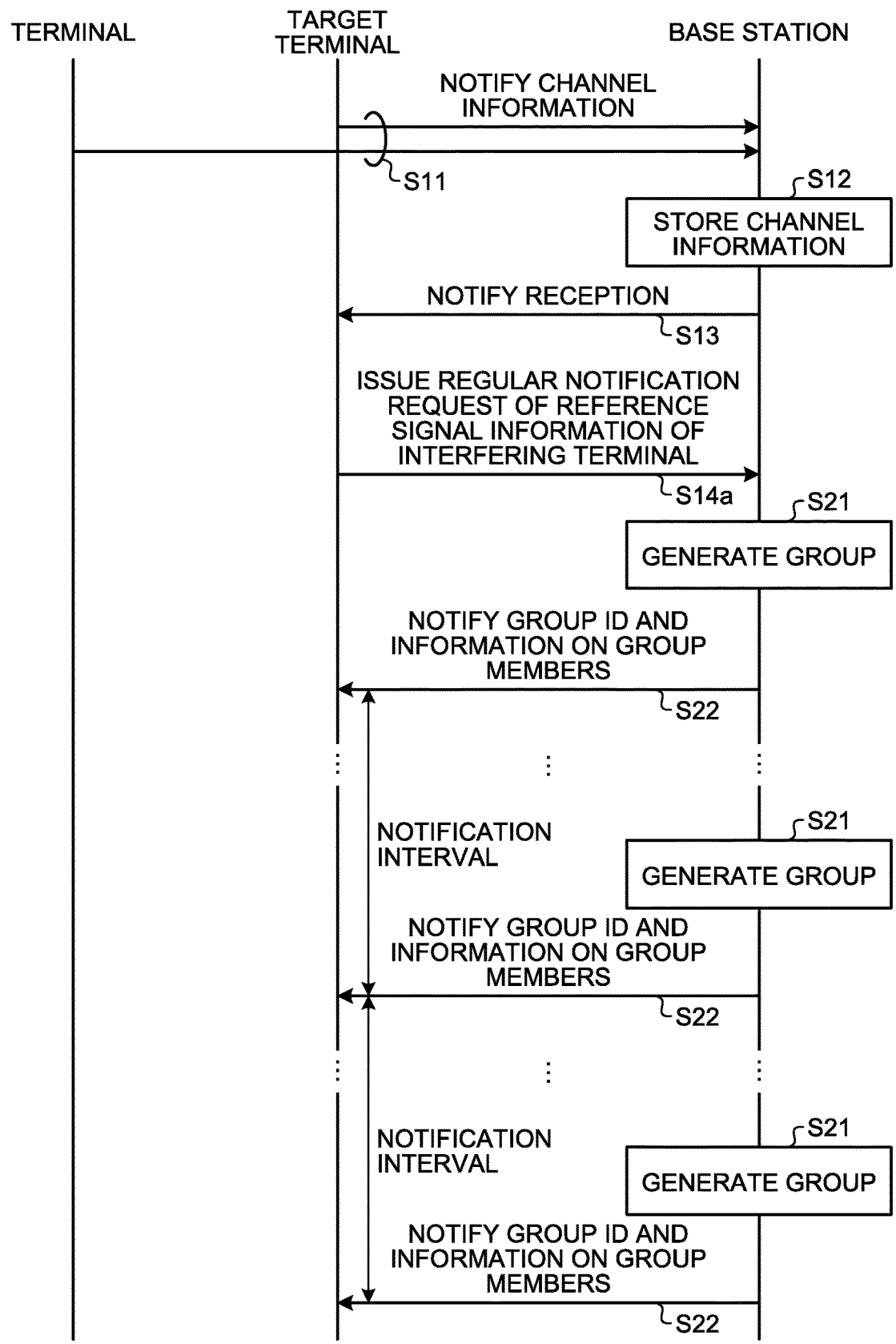
FIG. 13 is a sequence diagram illustrating another operation example of the wireless communication system according to the second embodiment.

FIG. 12 illustrates a sequence in which the base station 1a sends a group ID and the like to a target terminal in response to a request from the target terminal. Although an irregular notification is performed in the sequence in FIG. 12, the base station 1a may issue a notification regularly. In this case, the sequence illustrated in FIG. 13 is performed. FIG. 13 is a sequence diagram illustrating another operation example of the wireless communication system according to the second embodiment. In the operation in accordance with the sequence illustrated in FIG. 13, after performing Steps S11 to S13 illustrated in FIG. 12, a target terminal transmits a regular notification request of reference signal information of an interfering terminal to the base station 1a (Step S14a). The processes at Step S11 to S13 and S14a are the same as the processes at Steps S11 to S13 and S14a in FIG. 4 described in the first embodiment. The base station 1a having received the request at Step S14a performs Steps S21 and S22 described above to generate a groups and to notify the target terminal of a group ID and the like. Thereafter, the base station 1a performs Steps S21 and S22 regularly. That is, the base station 1a repeats Steps S21 and S22 each time a certain time corresponding to a notification interval illustrated in FIG. 13 has passed. Regular execution of Steps S21 and S2 may be ended when a predetermined time has passed, when Steps S21 and S22 have been repeated a predetermined number of times, or when an end request has been received from the target terminal. Further, the base station 1a may end regular execution of Steps S21 and S22 when the base station no longer receives a signal from the target terminal. Although illustrations thereof are omitted in FIG. 13, the base station 1a receives notification of channel information from all the terminals 2a including the target terminal in each of certain periods.

Figure 14:
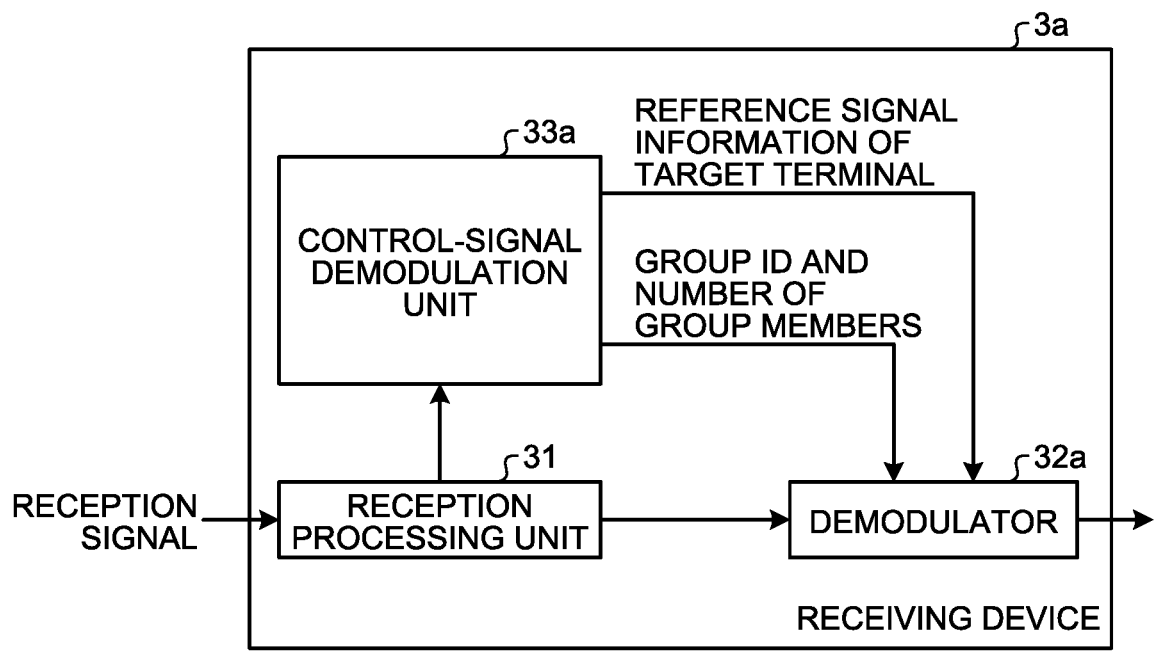
FIG. 14 is a diagram illustrating a configuration example of a receiving device according to the second embodiment.

FIG. 14 is a diagram illustrating a configuration example of a receiving device 3a according to the second embodiment. The receiving device 3a illustrated in FIG. 14 is a device obtained by replacing the demodulator 32 and the control-signal demodulation unit 33 in the receiving device 3 described in the first embodiment with a demodulator 32a and a control-signal demodulation unit 33a.

The demodulator 32a performs channel estimation or performs demodulation for every layer, similarly to the demodulator 32 of the receiving device 3 according to the first embodiment. In this demodulation, the demodulator 32a uses information on a reference signal of a target terminal, a group ID, and the number of group members that have been described above. In demodulation for each layer, first, the demodulator 32a generates a reference signal directed to the target terminal based on the information on the reference signal of the target terminal, and generates a reference signal directed to each interfering terminal based on the group ID and the number of group members. The demodulator 32a demodulates a data signal by using the reference signal directed to the target terminal, estimates an interference wave from each interfering terminal based on the reference signal directed to each interfering terminal, and cancels the interference component included in the data signal by using the estimated interference wave. Canceling of the interference component is performed by using an IRC method and the like.

Figure 15:
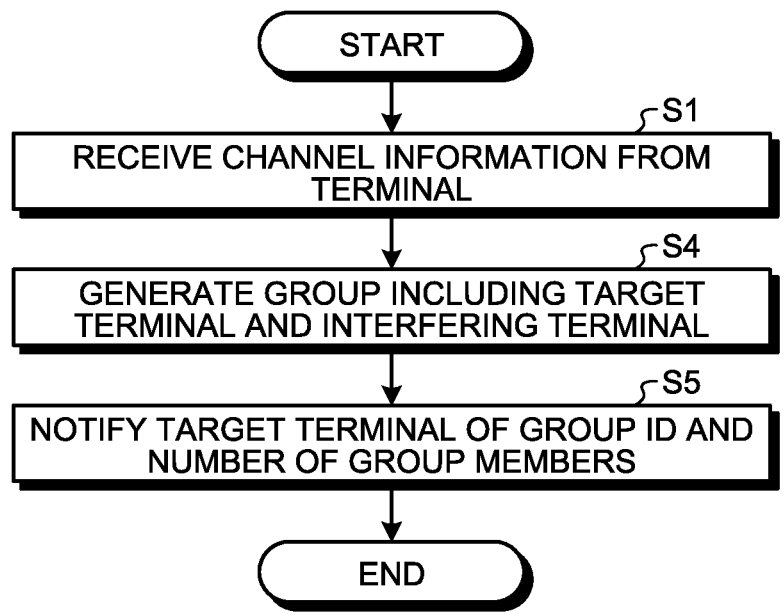
FIG. 15 is a flowchart illustrating an operation example of a base station according to the second embodiment.

FIG. 15 is a flowchart illustrating an operation example of the base station 1a according to the second embodiment, which illustrates an operation example in a case of transmitting a group ID and information on the group members described above as information on a reference signal of an interfering terminal to a target terminal.

As illustrated in FIG. 15, first, the base station 1a receives channel information from the terminals 2a (Step S1). At Step S1, the base station 1a receives channel information from all the terminals 2a. The base station 1a then generates a group including a target terminal and an interfering terminal (Step S4). At Step S4, the base station 1a generates, with regard to each terminal 2a, a group including the target terminal and the interfering terminal when the terminal 2a is assumed as the target terminal. That is, the base station 1a generates a group for each terminal 2. The base station 1a then notifies the target terminal of a group ID and the number of group members (Step S5). Normally, there are a plurality of target terminals, and the base station 1a transmits the group ID and the number of group members to each of the target terminals at Step S5.

As described above, in the wireless communication system according to the second embodiment, upon reception of channel information from each of the terminals 2a, the base station 1a determines an interfering terminal with respect to each of the terminals 2a when the corresponding terminal 2a is assumed as a target terminal, and generates a group including the target terminal and the interfering terminal. The base station 1a then notifies each terminal 2a of a group ID and the number of group members as information on a reference signal of the interfering terminal. With this configuration, the terminal 2a can calculate the interference component included in a reception signal based on the information on the reference signal of the interfering terminal, thereby being able to cancel the interference component from the reception signal. Accordingly, communication quality can be improved. Further, it is possible to prevent increase of the amount of control signals in a case where there are a plurality of interfering terminals.

Third embodiment.

In the second embodiment described above, there has been described a wireless communication system in which a target terminal and an interfering terminal are grouped and the target terminal reduces interference from the interfering terminal in the same group as itself. Further, in the second embodiment, there has been described a configuration in which a base station of a wireless communication system notifies a target terminal of a reference signal for an interfering terminal by using a group ID and the number of group members and a configuration in which a base station of a wireless communication system notifies a target terminal of a reference signal for an interfering terminal by using a group ID, the number of group members, and a group member ID. On the other hand, in a wireless communication system according to the third embodiment, a base station notifies a target terminal of a reference signal of the target terminal by using a port number. The configuration of the wireless communication system is identical to that of the first embodiment (see FIG. 1).

Figure 16:
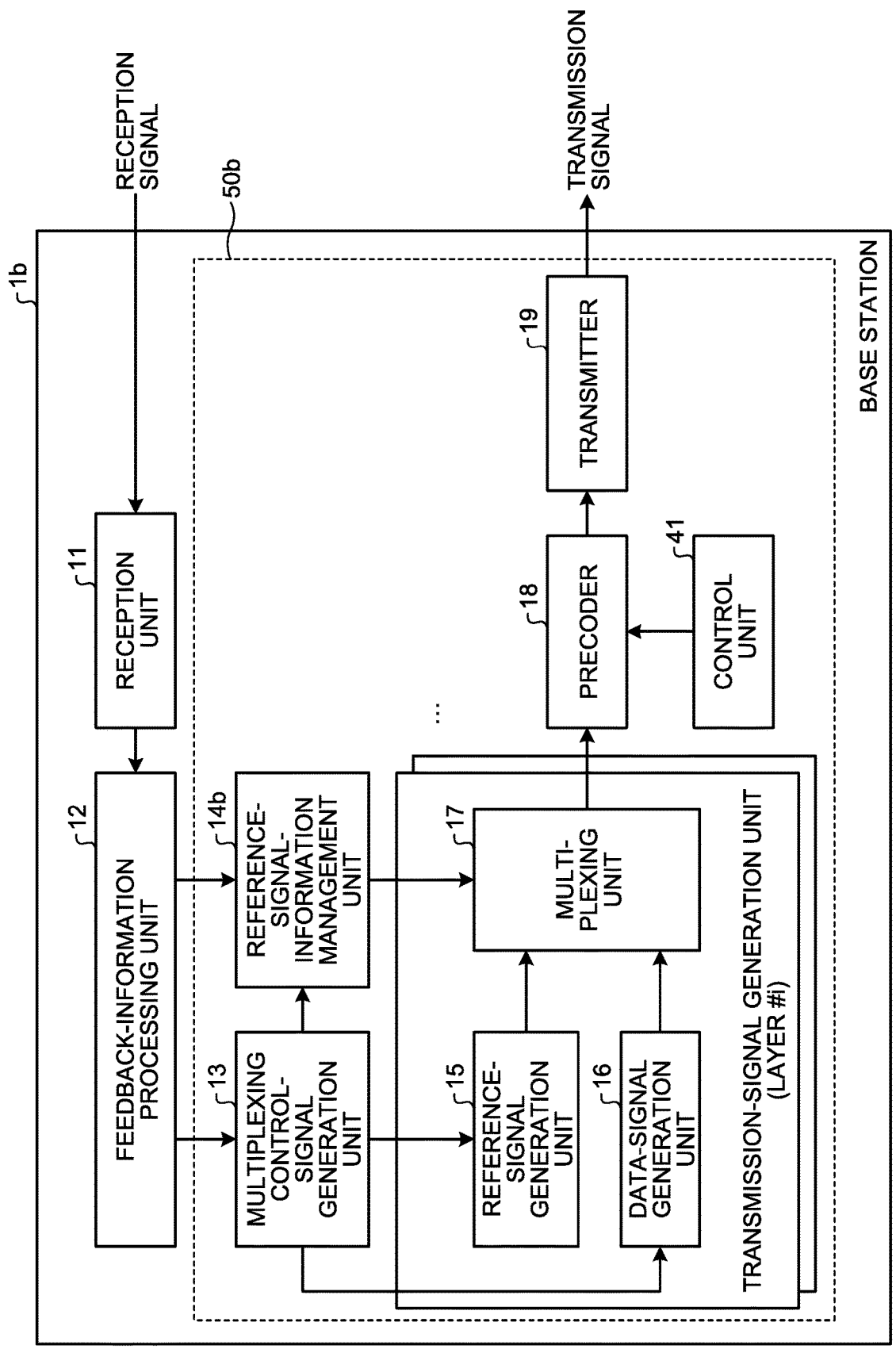
FIG. 16 is a diagram illustrating a configuration example of a base station according to a third embodiment.

FIG. 16 is a diagram illustrating a configuration example of a base station according to a third embodiment. In FIG. 16, constituent elements common to the base station 1 according to the first embodiment (see FIG. 2) are denoted by like reference signs. A base station 1b according to the third embodiment corresponds to the base station 1 according to the first embodiment in which the transmission device 50 is replaced with a transmission device 50b. The transmission device 50b is configured to include a reference-signal information management unit 14b in place of the reference-signal information management unit 14 of the transmission device 50 and to additionally include a control unit 41. A terminal according to the third embodiment is called "terminal 2b". The base station 1b groups the terminals 2b in an identical manner to the base station 1a according to the second embodiment.

The reference-signal information management unit 14b generates a control signal including information on a reference signal to be transmitted to the terminal 2b in an identical manner to the reference-signal information management unit 14 described in the first embodiment. The information on the reference signal included in the control signal generated by the reference-signal information management unit 14b is information indicating a port number described later. Similarly to the first and second embodiments, the reference signal is a DMRS.

The control unit 41 generates a control signal instructing a type of precoding, and outputs the control signal to a precoder 18. The control unit 41 generates a control signal instructing linear precoding or a control signal instructing nonlinear precoding. When the control signal input from the control unit 41 instructs linear precoding, the precoder 18 performs linear precoding, that is, precoding using linear processing for a transmission signal. When the control signal input from the control unit 41 instructs nonlinear precoding, the precoder 18 performs nonlinear precoding, that is, precoding using nonlinear processing for a transmission signal. Examples of nonlinear precoding include VP (Vector Perturbation) and THP (Tomlinson Harashima Precoding). When the control signal input from the control unit 41 instructs both linear precoding and nonlinear precoding, the precoder 18 performs both linear precoding and nonlinear precoding for a transmission signal.

The base station 1b according to the third embodiment retains a port mapping table illustrated in FIG. 17, and notifies a target terminal of a reference signal to be transmitted to the target terminal by using the port mapping table. The port mapping table includes an index, a port number associated with the index, the number of CDM (Code Division Multiplexing) groups not including data, and the number of DMRS symbols to be used. The DMRS symbol is a reference signal symbol. The CDM group will be described later. In a case of notifying a target terminal of a reference signal, the base station 1b generates a control signal that includes an index in the port mapping table as information on the reference signal, and transmits the control signal to the target terminal. As illustrated in FIG. 17, a port number and the like are associated with an index in the port mapping table, and the index is information indicating the port number. The base station 1b notifies the target terminal of an index in the port mapping table by using the DCI described above, for example.

Each terminal 2b according to the third embodiment also retains the port mapping table illustrated in FIG. 17. Upon reception of a control signal that includes an index in the port mapping table from the base station 1b, each terminal 2b acknowledges a port number assigned to itself based on the received index. Also, each terminal 2b identifies a reference signal transmitted thereto from the base station 1b based on the port number assigned to itself. Further, each terminal 2b identifies a reference signal to be transmitted from the base station 1b to another terminal that belongs to the same group as the terminal 2b based on the port number assigned to the terminal 2b. It is assumed that no data is transmitted in a group other than groups of assigned ports for indexes 6, 9, 10, 11, and 30. That is, SU-MIMO (Single User MIMO) transmission is assumed for the indexes 6, 9, 10, 11, and 30.

Figure 18:
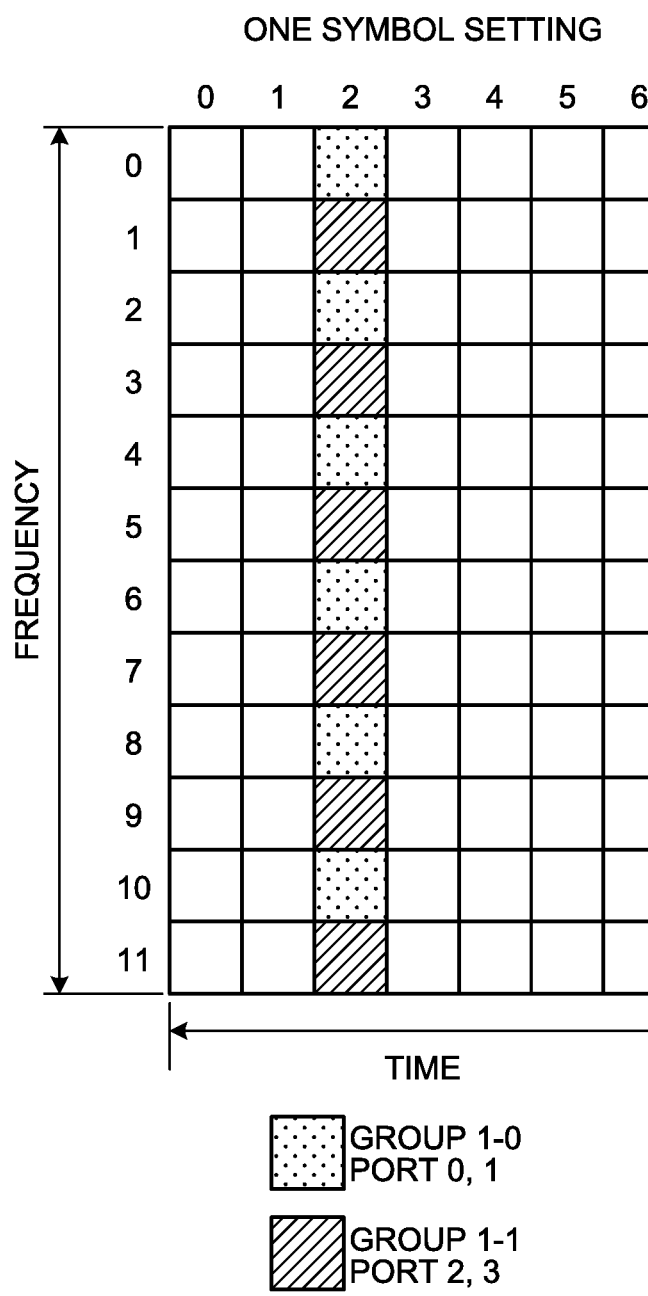
FIG. 18 is a diagram illustrating a first arrangement example of a reference signal in one resource block to be transmitted by the base station according to the third embodiment.
Figure 19:
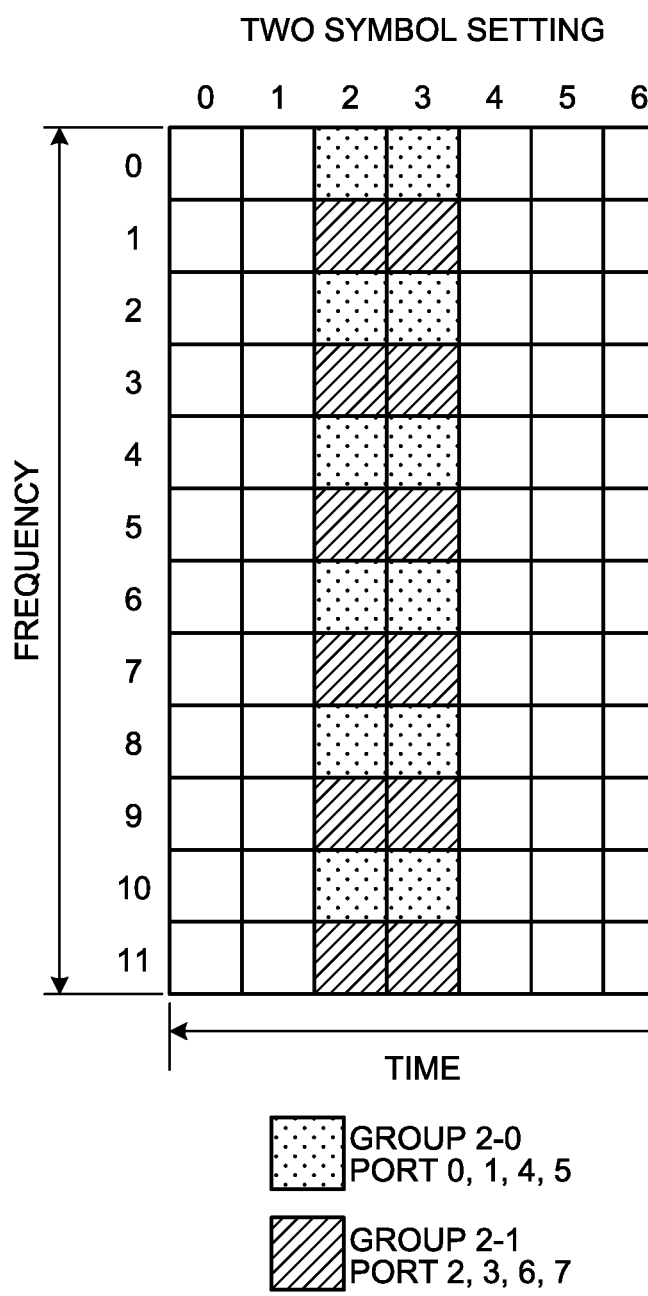
FIG. 19 is a diagram illustrating a second arrangement example of a reference signal in one resource block to be transmitted by the base station according to the third embodiment.

FIGS. 18 and 19 are diagrams illustrating an example of an arrangement of reference signals in one resource block transmitted to the terminal 2b from the base station 1b according to the third embodiment.

In the examples illustrated in FIGS. 18 and 19, the number of CDM groups is two. That is, the number of the CDM groups is the number of reference signal sequences included in one resource block. Each CDM group is frequency-multiplexed. One reference signal sequence is assigned to one of groups of the terminals 2b configured to include a target terminal and an interfering terminal.

In the example illustrated in FIGS. 18 and 19, the number of ports included in each CDM group is different between a case where the number of reference signal symbols included in one resource block is one and a case where the number is two. A port is associated with a reference signal sequence, and if the terminal 2b recognizes a port number associated with a reference signal sequence assigned thereto and the number of DMRS symbols, the terminal 2b can recognize a reference signal that has a possibility to be assigned to each of the terminals 2b configuring one group. The port number and the number of DMRS symbols are information indicating a candidate of a reference signal assigned to each of the terminals 2b configuring one group. Therefore, the target terminal can acknowledge a reference signal that has a possibility of having been assigned to an interfering terminal belonging to the same group as the target terminal, upon recognizing a reference signal assigned to the target terminal. The target terminal generates all reference signals that have a possibility of having been assigned to the interfering terminal, and estimates interference from the interfering terminal.

The description returns to the example illustrated in FIGS. 18 and 19. FIG. 18 is an arrangement example of reference signals in a case of one symbol setting, and illustrates an example in a case where the number of reference signal symbols included in one resource block is one. In the arrangement illustrated in FIG. 18, two ports are associated with one group. In one example, this arrangement is considered to be used in a case where a group of the terminals 2b is formed by one target terminal and one or less interfering terminal. FIG. 19 illustrates an arrangement example of reference signals in a case of two symbol setting, and illustrates an example in a case where the number of reference signal symbols included in one resource block is two. In the arrangement illustrated in FIG. 19, four ports are associated with one group. In one example of use, this arrangement is considered to be used in a case where a group of the terminals 2b is formed by one target terminal and three or less interfering terminals. Each reference signal is multiplied by an OCC, thereby being frequency-multiplexed while being orthogonalized. For simplifying the description, assuming that the number of reference signal symbols included in one resource block is X and a group index of a CDM group included in one resource block is Y, a CDM group is described as a "group X-Y". In the example illustrated in FIG. 18, a group 1-0 includes ports 0 and 1, and a group 1-1 includes ports 2 and 3. In the example illustrated in FIG. 19, a group 2-0 includes ports 0, 1, 4, and 5, and a group 2-1 includes ports 2, 3, 6, and 7. In a case of describing a position of a reference signal by coordinates (frequency, time), reference signals of terminals associated with the group 1-0 are arranged at coordinates (0, 2), (2, 2), (4, 2), (6, 2), (8, 2), and (10, 2) in the example illustrated in FIG. 18. Assuming that the reference signals arranged at these coordinates are $q_0$, $q_1$, $q_2$, $q_3$, $q_4$, and $q_5$, in a case where reference signals of two ports are multiplexed, reference signals $+q_0$, $-q_1$, $+q_2$, $-q_3$, $+q_4$, and $-q_5$ associated with the port 0 and reference signals $+q_0$, $-q_1$, $+q_2$, $-q_3$, $+q_4$, and $-q_5$ associated with the port 1 are arranged on the coordinates (0, 2), (2, 2), (4, 2), (6, 2), (8, 2), and (10, 2). Because reference signals are code-multiplexed with an OCC, orthogonality is maintained even when a plurality of reference signals are arranged at the same frequency and the same time, that is, at the same coordinates.

It is also possible to transmit data in place of a reference signal by using a resource element for transmitting the reference signal. Further, the "CDM group not including data" described above means a CDM group that transmits data in place of a reference signal by using a resource element for transmitting the reference signal. In a case of transmitting reference signals in all resource elements for transmitting the reference signals, "the number of CDM groups not including data" is "two". For example, if the number of DMRS symbols is one and reference signals are transmitted in all resource elements (frequency is 0 to 11) for a time of 2 in the arrangement example illustrated in FIG. 18, the number of CDM groups not including data is two. If the number of DMRS symbols is one and reference signals are transmitted in resource elements for frequencies of 1, 3, 5, 7, 9, and 11 among the resource elements for a time of 2 in the arrangement example illustrated in FIG. 18, the number of CDM groups not including data is one.

In a case of using the port mapping table illustrated in FIG. 17, when an index 26 is notified from the base station 1b to a target terminal, the target terminal determines that reference signals associated with port numbers 0, 1, and 4 are assigned thereto and it can perform rank-3 transmission, that is, data transmission in which three layers are multiplexed. In this case, a port number associated with communication that has a possibility of interfering with communication associated with the port numbers {0, 1, 4} assigned to the target terminal is a port number 5 that belongs to the same group. However, because there is no means to notify the target terminal from the base station 1b whether a reference signal associated with the port number 5 is assigned to another terminal, that is, whether there is an interfering terminal, the target terminal does not acknowledge whether there is the interfering terminal with respect thereto.

Further, when being notified of an index 20 from the base station 1b, the target terminal determines that reference signals associated with the port numbers {0, 1} are assigned thereto. However, the target terminal cannot acknowledge from the notified index 20 whether one or both of the reference signal associated with the port number 4 that belongs to the same CDM group as the port numbers {0, 1} and the reference signal associated with the port number 5 is assigned to another terminal. Therefore, the base station 1b may notify the target terminal that is to be notified of an index 20 of a port number in the port numbers 4 and 5 which is associated with a reference signal assigned to the interfering terminal (hereinafter, "interfering port number"). Notification of the interfering port number is performed by using DCI as with notification of an index, for example.

However, in the method described above, it is necessary to send the interfering port number for every index notified to the target terminal. Therefore, the types of signaling information are various, overhead is increased, and numerous number of bits are required for control information. Accordingly, the base station 1b may notify the target terminal of the number of ports associated with reference signals assigned to the interfering terminals (hereinafter, "interfering ports") in place of the interfering port number. For example, when the index 20 is notified to the target terminal, the ports 0 and 1 are assigned to the target terminal (see FIG. 17). The ports 4 and 5 can be interfering ports (see FIG. 19). In this case, the number of the interfering ports is any of zero, one, and two. By notifying the target terminal of the number of the interfering ports from the base station 1b, it becomes clear whether interference from the interfering terminal has to be removed, and the target terminal can remove interference without depending on the numerical value of each index.

With regard to the reference-signal information management unit 14b that generates a control signal including an index indicative of a port number, the presence or absence of an interfering port may be notified from an upper layer by using a flag that indicates whether there is an interfering port in each group. For example, in the upper layer, it may be notified to the reference-signal information management unit 14b whether there is an interfering port with respect to a port assigned to a target terminal within a group by using a flag, for example, INTRA_GROUP_INT. The name of a parameter INTRA_GROUP_INT is only an example. Any name may be used as long as a parameter with the name indicates an interfering status in the group. In a case of using INTRA_GROUP_INT as a parameter, INTRA_GROUP_INT=0 indicates that the presence of an interfering port is not notified, for example. That is, when INTRA_GROUP_INT=0, the number of interfering ports is zero. In a case where there is no interfering port, it is possible to reduce signaling overhead to a terminal by not notifying the terminal of the number of interfering ports. INTRA_GROUP_INT=1 indicates that there is an interfering port in a group. In a case of notifying the target terminal of the port numbers 0 and 1 by using the index 20 illustrated in FIG. 17, for example, when INTRA_GROUP_INT=1 has been notified from the upper layer, the reference-signal information management unit 14b notifies the target terminal of the number of interfering ports. In this case, assuming that a parameter representing the number of interfering ports is N_INT_PORT, N_INT_PORT={1, 2}. That is, N_INT_PORT=1 or N_INT_PORT=2 is notified from the reference-signal information management unit 14b to the target terminal.

In a case of notifying the target material of the port numbers 4 and 5 by using an index 22 illustrated in FIG. 17, the reference-signal information management unit 14b can notify the target terminal of N_INT_PORT=2. When the target terminal has been notified of N_INT_PORT=2, ports with the port numbers 0 and 1 in the same group as the port numbers 4 and 5 are interfering ports.

Further, in a case where an index 12 illustrated in FIG. 17 is notified to the target terminal, there is a possibility that the port 0 is assigned to the target terminal and the ports 1, 4, and 5 become interfering ports. In this case, the number of interfering ports N_INT_PORT is any of one, two, and three. If the port numbers are set in each terminal in an ascending order, when N_INT_PORT=2 is set, the port 1 and the port 4 become interfering ports. When N_INT_PORT=1 is set, the port 1 becomes an interfering port.

There is a possibility that one or a plurality of interfering terminals can be present. In a case where there is an interfering terminal, the base station 1b may notify the target terminal of the number of the interfering terminals. By using both notification of N_INT_PORT described above and notification of number of the interfering terminals, it is possible to transmit further detailed information. A parameter representing the number of interfering terminals is assumed to be N_INT_UE. For example, if the index 12 in FIG. 17 is notified and the port 0 is set in the target terminal, the number of interfering terminals is zero, one, two, or three. If the port numbers are set in an ascending order in each terminal, when the number of interfering terminals is one, that is, N_INT_UE=1, the port 1 is set in the interfering terminal. When N_INT_PORT=3 and N_INT_UE=3, the ports 1, 2, and 3 are set in three interfering terminals one by one.

When N_INT_PORT=3 and N_INT_UE=2, there are two interfering terminals, and the target terminal that has received notification of N_INT_PORT=3 and N_INT_UE=2 recognizes two ports are set in one of the interfering terminals and one port is set in the other interfering terminal. In this case, the index 12 in FIG. 17 is notified from the base station 1b to the target terminal, and a port setting state in two interfering terminals are such a state that the port 1 is set in the first interfering terminal and the ports 2 and 3 are set in the second interfering terminal or such a state that the ports 1 and 2 are set in the first interfering terminal and the port 3 is set in the second interfering terminal. The target terminal removes interference considering both the port setting states.

N_INT_PORT is notified by the DCI described above. Further, INTRA_GROUP_INT is notified by using the RRC described above or the like. The number of interfering ports and the number of interfering terminals may be notified in an upper layer such as RRC. In a case where those are notified in the upper layer, values cannot be updated frequently. Therefore, the maximum number of interfering ports, the maximum number of interfering terminals, or the like may be notified.

The port mapping table illustrated in FIG. 17 corresponds to the arrangement of reference signals illustrated in FIGS. 18 and 19. A port mapping table illustrated in FIGS. 20 and 21 may be used in place of the port mapping table illustrated in FIG. 17. The port mapping table illustrated in FIGS. 20 and 21 corresponds to an arrangement of reference signals illustrated in FIGS. 22 and 23. FIGS. 20 and 21 illustrate one port mapping table. More specifically, FIG. 20 illustrates the former half of the port mapping table which corresponds to indexes 0 to 31, and FIG. 21 illustrates the latter half corresponding to indexes 32 to 63. In a case of using a first mapping table that is the port mapping table illustrated in FIG. 17 and a second mapping table that is the port mapping table illustrated in FIGS. 20 and 21, the type of port mapping is notified from the base station 1b to a target terminal in an upper layer. For example, it is assumed that setting of the first mapping table is configuration_1 and setting of the second mapping table is configuration_2. In the upper layer, a parameter, for example, DMRS_CONFIG_NUM is prepared, the configuration 1 is instructed from the base station 1b to the target terminal by DMRS_CONFIG_NUM=0, and the configuration 2 is instructed from the base station 1b to the target terminal by DMRS_CONFIG_NUM=1.

A DMRS sequence that is a reference signal sequence arranged in one resource block may be different in a signal pattern for each DMRS. Further, a DMRS sequence may be generated by using a scramble ID. For example, a DMRS sequence is generated by using a PN sequence generator. An initial value of the PN sequence generator may be set in accordance with the following expression (3) to allow the initial value to be changed in accordance with a symbol index.

[Expression 3]

$$c_{init} = (2^{17} \cdot (14n_s + 1 + 1)(2N_{ID}^{(nSCID)} + 1) + 2N_{ID}^{(nSCID)} + n_{SCID}) \bmod 2^{31} \quad (3)$$

In the expression (3), $n_s$ is the slot number in a frame, I is the symbol number in a slot, and $n_{SCID}$ is a scramble ID that is 0 or 1. Also, to a parameter represented by the following expression (4) in the expression (3), a different value is set in accordance with the scramble ID. The parameter represented by the expression (4) may be differently set for each terminal 2b.

[Expression 4]

$$N_{ID}^{(nSCID)} \qquad (4)$$

In a case of generating a DMRS sequence by using a PN sequence generator, the base station 1b may set an initial value of the PN sequence generator in accordance with the expression (3) and generate a DMRS sequence for 1 OFDM symbol.

When generating DMRS sequences to be transmitted to the terminals 2b in the same group, the base station 1b may set the same value or different values to the parameter represented by the expression (4). In a case of setting the same value to the parameter represented by the expression (4), the target terminal can generate a DMRS sequence for an interfering terminal by using the parameter given to the target terminal. Further, the base station 1b may notify the target terminal of a scramble ID used by the interfering terminal along with an interfering port number.

Furthermore, the base station 1b may generate a DMRS by using a prescribed method. That is, it is not necessary to generate a DMRS by the above method using a group ID and the like, but the DMRS may be generated by a conventional method using a cell ID. In this case, it suffices that an OCC is applied to every port. By such a generation method, it is possible to generate a DMRS sequence that does not depend on port mapping and a group ID.

Although the base station 1b notifies the target terminal of information on a reference signal of each of the terminals 2b that belong to the same group by using a port mapping table, the base station 1b may notify the target terminal of information on a reference signals of the terminals 2b that belong to another group. Transmission signals from the base station 1b to the terminals 2b are assigned to different frequencies between groups, and are multiplexed in the same time. However, there is a possibility that if a channel is varied in an OFDM signal, interference occurs between REs. In this case, the target terminal is subjected to interference from the terminal 2b in another group, that is, there is an interfering terminal with respect to the target terminal in a group other than the group to which the target terminal belongs. Therefore, by notifying the target terminal of information on reference signals of the terminals 2b that belong to another group from the base station 1b, the target terminal can suppress interference occurring between groups. As a result, communication quality can be improved.

As is apparent from the configuration of the port mapping table illustrated in FIG. 17 or the like, the target terminal is notified of the number of CDM groups not including data from the base station 1b. Therefore, the target terminal can acknowledge whether reference signals are assigned to terminals that belong to another group. However, although the target terminal can acknowledge that reference signals are assigned to terminals that belong to another group, it cannot acknowledge which port the terminal 2b serving as an interfering terminal corresponds to. Therefore, in order to indicate interference between groups, I_N_INT_PORT and I_N_INT_UE are defined, and the base station 1b notifies the target terminal of a reference signal for an interfering terminal in another group by using these parameters. I_N_INT_PORT indicates the number of interfering ports in a different group, that is, the number of ports assigned to interfering terminals that belong to a different group. I_N_INT_UE indicates the number of interfering terminals that belong to a different group. For example, in a case where the port mapping table illustrated in FIG. 17 and the arrangement of reference signals illustrated in FIGS. 18 and 19 are used and an index 4 is notified from the base station 1b to the target terminal, it means that the number of CDM groups not including data is two and there is the terminal 2b that receives data from the base station 1b in each of two groups. In addition, the number of ports associated with each group is two. Therefore, I_N_INT_PORT={1, 2} and I_N_INT_UE={1, 2}. That is, the number of interfering ports in a different group is one or two, and the number of interfering terminals that belong to the different group is one or two. Further, a parameter INTER_GROUP_INT notified from an upper layer may be defined, and interference from a different group may be notified when INTER_GROUP_INT=1 and may not be notified when INTER_GROUP_INT=0.

Although a case where if the number of CDM groups is two, that is, the terminals 2b that receive data from the base station 1b are grouped into two groups has been described in the third embodiment, this case is only an example. The number of CDM groups may be three. In a case where the number of CDM groups is three and a target terminal is subjected to interference from the terminal 2b in another group, the base station 1b notifies the target terminal of the other group to which the terminal 2b interfering with the target terminal belongs (hereinafter, "interfering group"). For example, the base station 1b notifies the target terminal of the interfering group by using the parameters, for example, INTER_GROUP_INT_0 that indicates whether an interfering group 0 is present and INTER_GROUP_INT_1 that indicates whether an interfering group 1 is present. For example, INTER_GROUP_INT_0=1 indicates that the interfering group 0 is present, INTER_GROUP_INT 0=0 indicates that the interfering group 0 is not present, INTER_GROUP_INT_1=1 indicates that the interfering group 1 is present, and INTER_GROUP_INT_1=0 indicates that the interfering group 1 is not present. Association between an interfering group with respect to the target terminal and another group when it is assumed that three CDM groups are a group 2-0, a group 2-1, and a group 2-2 is defined in the following manner. The interfering groups 0 and 1 with respect to the target terminal when the target terminal is present in the group 2-0 correspond to "the group 2-1" and "the group 2-2", respectively; the interfering groups 0 and 1 with respect to the target terminal when the target terminal is present in the group 2-1 correspond to "the group 2-0" and "the group 2-2", respectively; and the interfering groups 0 and 1 with respect to the target terminal when the target terminal is present in the group 2-2 correspond to "the group 2-0" and "the group 2-1", respectively. For example, in a case where the target terminal present in the group 2-0 is subjected to interference from a terminal in the group 2-1 but is not subjected to interference from a terminal of the group 2-2, the base station 1b notifies the target terminal present in the group 2-0 of INTER_GROUP_INT_0=1 and INTER_GROUP_INT_1=0. In a case where the target terminal present in the group 2-1 is subjected to interference from a terminal in the group 2-0 and is subjected to interference from a terminal of the group 2-2, the base station 1b notifies the target terminal present in the group 2-1 of INTER_GROUP_INT_0=1 and INTER_GROUP_INT_1=1. In a case where the target terminal present in the group 2-2 is not subjected to interference from a terminal in the group 2-0 but is subjected to interference from a terminal of the group 2-1, the base station 1b notifies the target terminal present in the group 2-2 of INTER_GROUP_INT_0=0 and INTER_GROUP_INT_1=1. Similarly, parameters I_N_INT_PORT_0 and I_N_INT_PORT_1 that indicate whether each port assigned to a terminal in each group corresponds to an interfering port and parameters I_N_INT_UE_0 and I_N_INT_UE_1 that indicate whether the terminal 2b corresponds to an interfering terminal are defined, association between the respective parameters and ports and association between the respective parameters and the terminals 2b are performed in advance, and the base station 1b notifies the target terminal of an interfering terminal and an interfering port in an interfering group by using these parameters.

Figure 22:
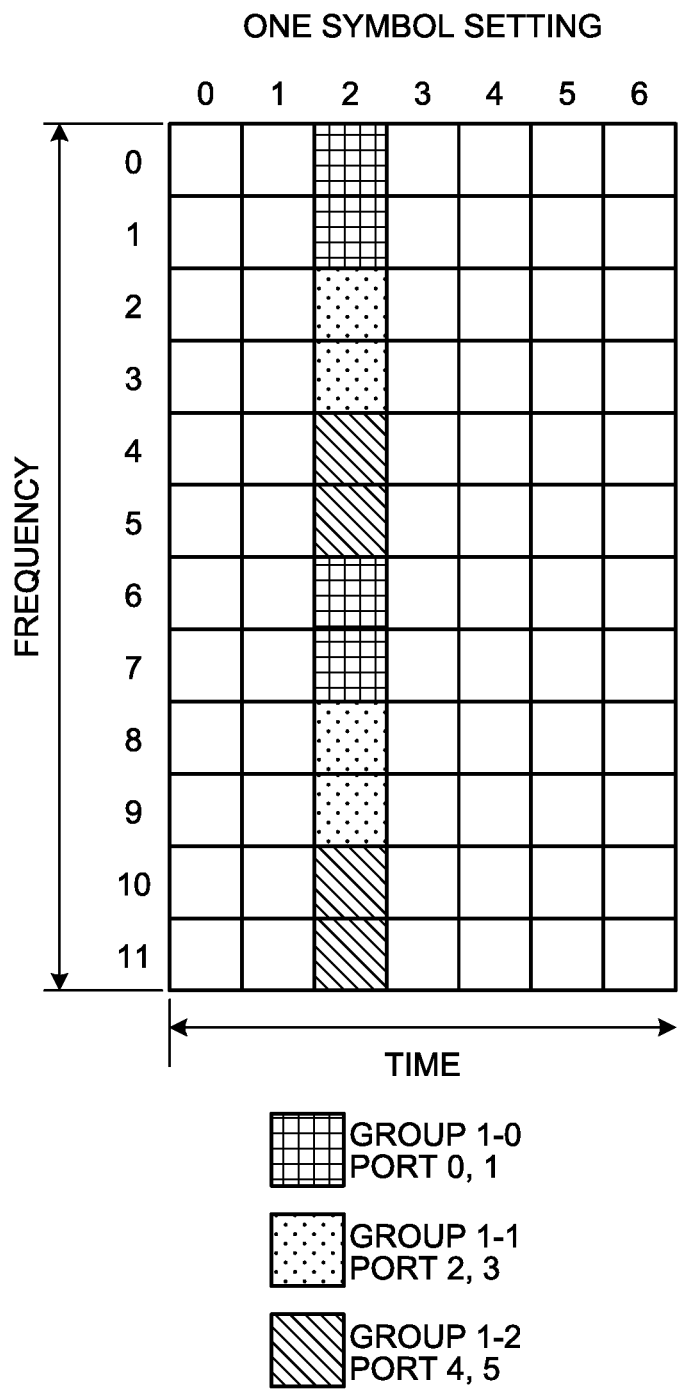
FIG. 22 is a diagram illustrating a third arrangement example of a reference signal in one resource block to be transmitted by the base station according to the third embodiment.
Figure 23:
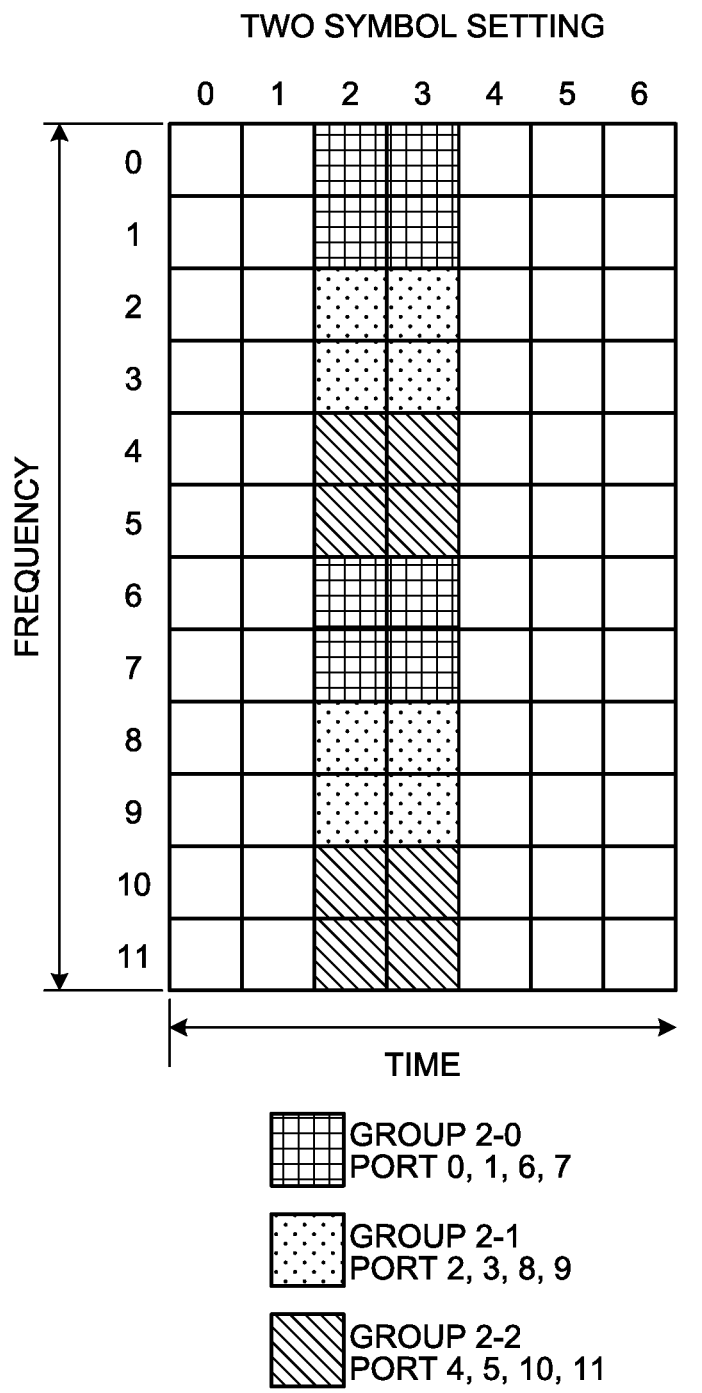
FIG. 23 is a diagram illustrating a fourth arrangement example of a reference signal in one resource block to be transmitted by the base station according to the third embodiment.
Figure 24:
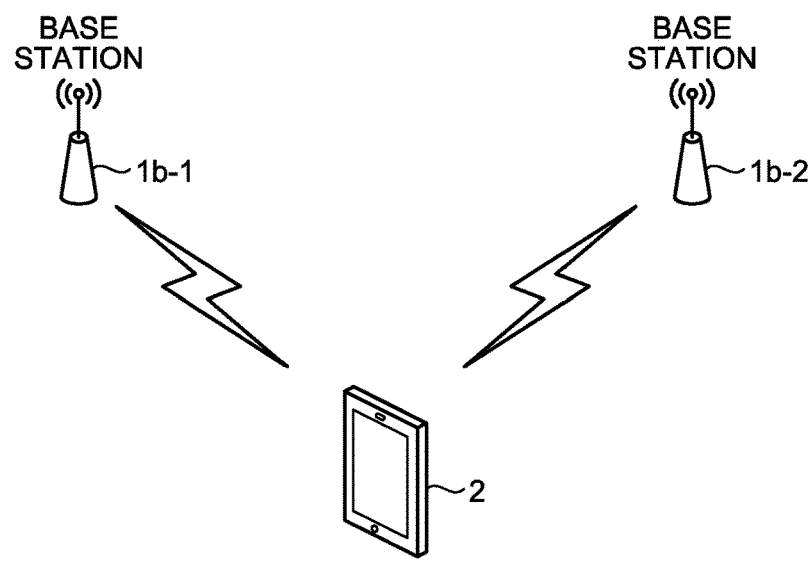
FIG. 24 is a diagram illustrating a first example of a communication mode between the base station and the terminal according to the third embodiment.
Figure 25:
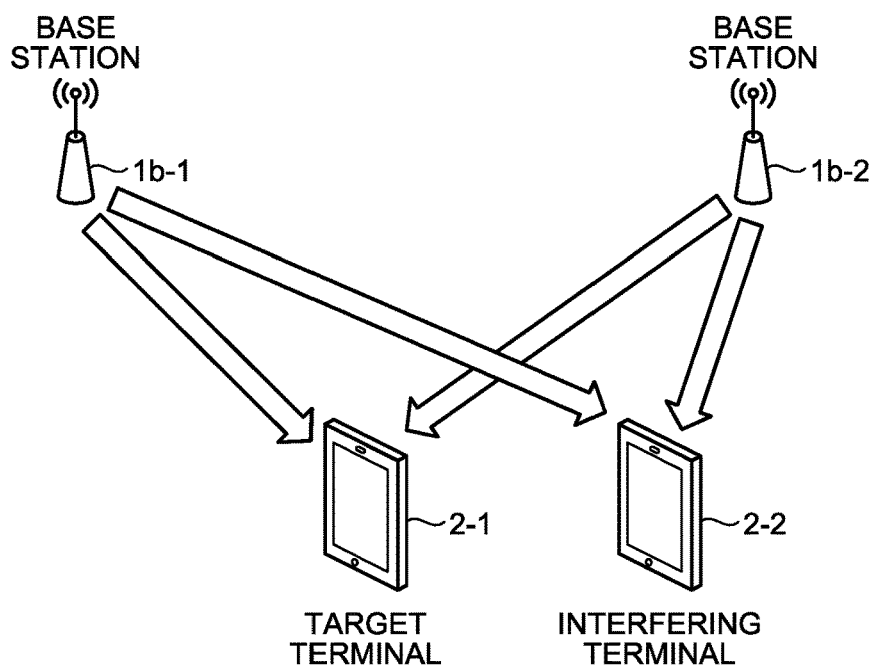
FIG. 25 is a diagram illustrating a second example of the communication mode between the base station and the terminal according to the third embodiment.

In the third embodiment, notification of interference corresponding to one base station, that is, an operation of notifying a target terminal of an interfering terminal in a case where one base station and the target terminal communicate with each other has been described. However, it is possible to perform notification of interference in a case where a plurality of base stations communicate with a target terminal, and the base station can notify the target terminal of a plurality of port numbers for SU-MIMO. A port number for SU-MIMO in a port mapping table is determined in standards or the like. In a case where the terminal 2b communicates with base stations 1b-1 and 1b-2 as illustrated in FIG. 24, if the terminal 2b acknowledges in advance that it is notified of separate port numbers for SU-MIMO from the respective base stations 1b-1 and 1b-2, the terminal 2b can measure interference between communication with each base station and communication with another base station. Further, in a case where there are a target terminal 2-1 and an interfering terminal 2-2 as illustrated in FIG. 25, if the target terminal 2-1 grasps DMRS port information notified to the interfering terminal 2-2, the target terminal 2-1 can remove interference from communication between the base stations 1b-1 and 1b-2 and the interfering terminal 2-2. If a CDM group or port information set in each terminal when a plurality of base stations perform transmission is determined in standards in advance, measurement of interference can be performed easily. For example, in a case of an index 23 in the port mapping table illustrated in FIG. 20, it is possible to use a mode in which one of two ports in the group 1-0 and one of two ports in the group 1-1 illustrated in FIG. 22 are used for communication by a plurality of base stations. Further, an index that indicates a combination of the port number 1 and a port number 3 may be used. Furthermore, a portion of index numbers in the port mapping table illustrated in FIG. 17 or a portion of index numbers of the port mapping table illustrated in FIGS. 20 and 21 may be used for communication by a plurality of base stations.

As described above, in a wireless communication system according to the third embodiment, the base station 1b generates a group including a target terminal and an interfering terminal, as with the base station 1a according to the second embodiment. Also, the base station 1b notifies the target terminal of information on a reference signal to be transmitted to the target terminal and information on a reference signal to be transmitted to the interfering terminal by using a port mapping table retained in both the base station 1b and each terminal. Therefore, it is possible to obtain identical effects to those obtained in the second embodiment. Further, the base station 1b notifies the target terminal of the information on the reference signal to be transmitted to the target terminal and the information on the reference signal to be transmitted to the interfering terminal by notifying the target terminal of an index number in the port mapping table. Therefore, it is possible to suppress the amount of control information transmitted to the target terminal.

Fourth embodiment.

In the fourth embodiment, the precoder 18 of the base station 1b described in the third embodiment is described.

In recent years, application of nonlinear precoding that performs nonlinear processing for a transmission signal to perform precoding has been studied. Nonlinear precoding is processing performed for a signal to be transmitted to each of a plurality of terminals, and each terminal that is a destination of the signal after being subjected to nonlinear processing has to acknowledge a reference signal transmitted to another terminal when demodulating a data signal transmitted to itself. That is, each terminal that communicates with the base station 1b that notifies each terminal of information on a reference signal by using a port number has to acknowledge a port number assigned to another terminal. Therefore, in a case where the precoder 18 performs nonlinear precoding, the base station 1b notifies a target terminal of a port number assigned to an interfering terminal. In the third embodiment, the base station 1b notifies a target terminal of an index in a port mapping table by DCI, thereby notifying the target terminal of a port number assigned to the target terminal. Meanwhile, the base station 1b according to a fourth embodiment additionally notifies the target terminal of a port number assigned to the interfering terminal when notifying the target terminal of the index in the port mapping table by DCI to notify the target terminal of the port number assigned to the target terminal. For example, NLP_INTF_PORT_0 is defined as a parameter for indicating the port number assigned to the interfering terminal, a value of the index in the port mapping table is set to this parameter, and the base station 1b transmits this value to the target terminal. In this manner, the base station 1b notifies the target terminal of an interfering port number that is the port number assigned to the interfering terminal. For example, in a case where the port numbers 0 and 1 associated with the index 20 in the port mapping table illustrated in FIG. 17 are assigned to the target terminal and the port numbers 4 and 5 associated with the index 22 are assigned to the interfering terminal, the base station 1b notifies the target terminal of NLP_INTF_PORT_0=22 in addition to the index associated with the port numbers assigned to the target terminal.

Although a case of performing nonlinear precoding for two terminals has been described here, nonlinear precoding may be performed for three or more terminals. In a case of performing nonlinear precoding for three terminals, NLP_INTF_PORT_1 is defined in addition to NLP_INTF_PORT_0 described above, and the base station 1b sets the indexes associated with port numbers assigned to two interfering terminals among the indexes in a port mapping table to NLP_INTF_PORT_0 and NLP_INTF_PORT_1. For example, in a case where the port numbers 0 and 1 associated with the index 20 in the port mapping table illustrated in FIG. 17 are assigned to the target terminal and the port number 4 associated with an index 16 and the port number 5 associated with an index 17 are respectively assigned to the two remaining interfering terminals, the base station 1b sets NLP_INTF_PORT_0=16 and NLP_INTF_PORT_1=17.

Although an example of defining and using a parameter that indicates an interfering port number, for example, NLP_INTF_PORT_0 has been described in the above descriptions, the port mapping table illustrated in FIG. 17 and the port mapping table illustrated in FIGS. 20 and 21 may be configured to include the interfering port number. In this case, the base station 1*b* can notify the target terminal of the port number assigned to the target terminal and the interfering port number by using one index.

With regard to the reference-signal information management unit 14*b* that generates a control signal including an index indicative of a port number, it may be notified from an upper layer whether to perform nonlinear precoding by using a flag that indicates whether to perform nonlinear precoding. For example, in the upper layer, it may be notified to the reference-signal information management unit 14*b* whether to perform nonlinear precoding by using a flag, for example, NLP FLAG. In a case where the flag is set, the reference-signal information management unit 14*b* generates a control signal including an index that indicates the port number assigned to the interfering terminal.

In the above descriptions, a method of notifying the terminal 2*b* of an interfering port number in a case where the base station 1*b* transmits a signal that has been subjected only to nonlinear precoding to the terminal 2*b* has been described. Next, a method of notifying the terminal 2*b* of the interfering port number from the base station 1*b* when the base station 1*b* transmits a signal that has been subjected to nonlinear precoding and linear precoding will be described.

For example, in a case of using the arrangement of reference signals illustrated in FIG. 19, it is assumed that: the port 0 is assigned to a terminal 2*b*-1, the port 1 is assigned to a terminal 2*b*-2, the port 4 is assigned to a terminal 2*b*-3, the port 6 is assigned to a terminal 2*b*-4; a first group including the terminals 2*b*-1 and 2*b*-2 and a second group including the terminals 2*b*-3 and 2*b*-4 are separated from each other by linear precoding; and nonlinear precoding is performed for the terminals 2*b*-1 and 2*b*-2. In this case, interference occurs between two groups separated from each other by linear precoding. In a case where a target terminal is the terminal 2*b*-1, the base station 1*b* notifies the terminal 2*b*-1 of information on a port number assigned to the terminal 2*b*-2, as described in the fourth embodiment. The base station 1*b* also sets N_INT_UE=2 and N_INT_PORT=2 by using N_INT_UE and N_INT_PORT described above and transmits those to the target terminal, thereby notifying the target terminal that the terminals 2*b*-3 and 2*b*-4 are interfering terminals. Because this example uses both nonlinear precoding and linear precoding, the base station 1*b* notifies the interfering terminal and the target terminal of use of both nonlinear precoding and linear precoding by using a parameter in an upper layer, for example.

It is assumed that nonlinear precoding is performed for a data signal to be transmitted by using a PDSCH (Physical Downlink Shared Channel) and linear precoding is performed for a DMRS. If nonlinear precoding is performed for a DMRS, the phase and the amplitude of a DMRS symbol are distorted, which makes it impossible to perform channel estimation using a DMRS on a receiving side. Therefore, in a case where the base station 1*b* performs both linear precoding and nonlinear precoding, the precoder 18 of the base station 1*b* is configured to include a signal processing unit that performs linear precoding and a signal processing unit that performs nonlinear precoding. The precoder 18 performs linear precoding or nonlinear precoding in accordance with an instruction from the control unit 41.

Figure 26:
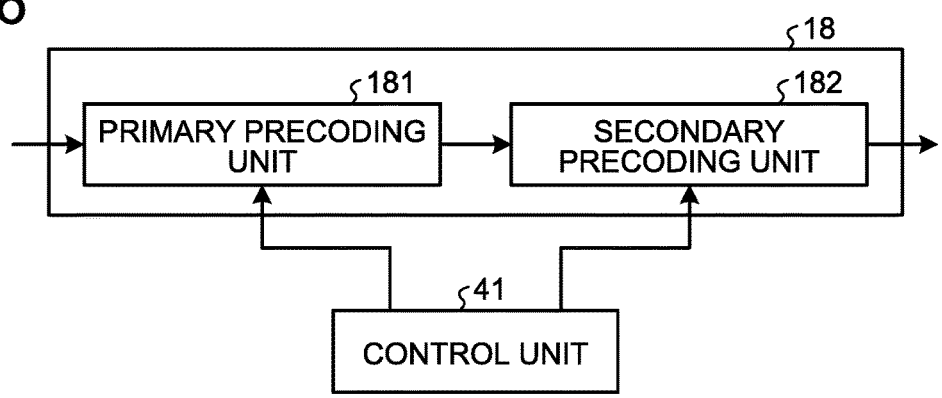
FIG. 26 is a diagram illustrating a configuration example of a precoder included in a base station according to a fourth embodiment.

FIG. 26 is a diagram illustrating an example of a precoder included in a base station according to the fourth embodiment. The precoder 18 illustrated in FIG. 26 includes a primary precoding unit 181 and a secondary precoding unit 182. In the precoding unit 18 illustrated in FIG. 26, one of the primary precoding unit 181 and the secondary precoding unit 182 performs linear precoding and the other performs nonlinear precoding. For example, the primary precoding unit 181 performs linear precoding, and the secondary precoding unit 182 performs nonlinear precoding. The precoder 18 may be configured in such a manner that the primary precoding unit 181 performs nonlinear precoding and the secondary precoding unit 182 performs linear precoding. In the configuration in which the primary precoding unit 181 performs linear precoding and the secondary precoding unit 182 performs nonlinear precoding, when a signal to be precoded is a reference signal, the control unit 41 instructs the primary precoding unit 181 to perform precoding and instructs the secondary precoding unit 182 not to perform precoding. Also, when a signal to be precoded is a data signal, the control unit 41 may instruct the primary precoding unit 181 not to perform precoding and instruct the secondary precoding unit 182 to perform precoding. In a case where the base station 1*b* notifies the terminal 2*b* of a precoding method to be used, it suffices that a parameter indicating the precoding method is defined and notification is performed by using RRC described above. Further, the base station 1*b* may execute control of switching the precoding method by using a MAC-CE or DCI described above, for example. In data transmission, both primary precoding and secondary precoding may be performed.

Figure 27:
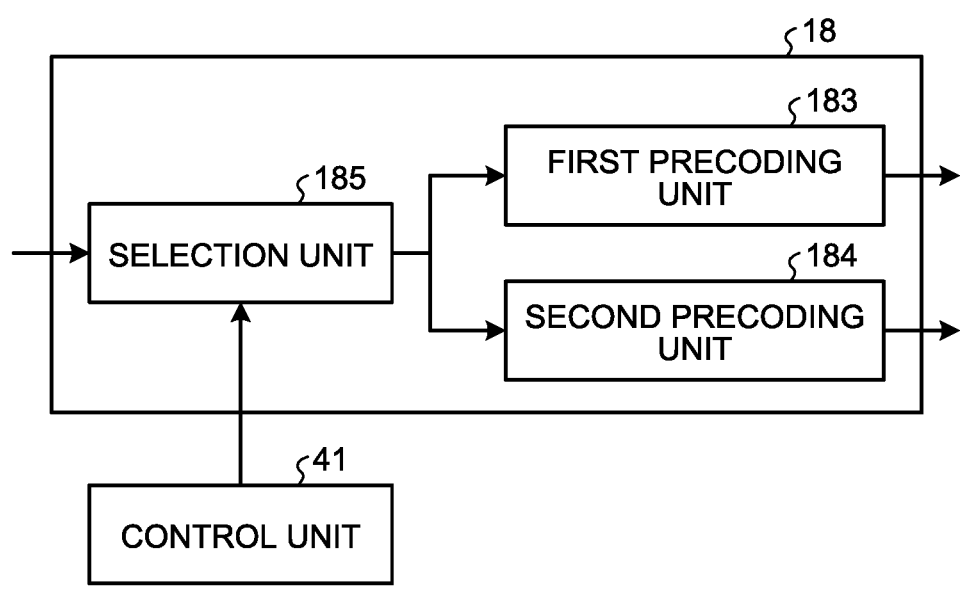
FIG. 27 is a diagram illustrating another configuration example of the precoder included in the base station according to the fourth embodiment.

Furthermore, the precoder 18 may be configured as illustrated in FIG. 27. FIG. 27 is a diagram illustrating another example of the precoding included in the base station according to the fourth embodiment. The precoder 18 illustrated in FIG. 27 includes a first precoding unit 183, a second precoding unit 184, and a selection unit 185. One of the first precoding unit 183 and the second precoding unit 184 performs linear precoding and the other performs nonlinear precoding. For example, the first precoding unit 183 performs linear precoding, and the second precoding unit 184 performs nonlinear precoding. In this case, when a reference signal is input, the selection unit 185 outputs it to the first precoding unit 183 to cause the first precoding unit 183 to perform linear precoding. When a data signal is input, the selection unit 185 outputs it to the second precoding unit 184 to cause the second precoding unit 184 to perform nonlinear precoding. The first precoding unit 183 may be configured as a precoder in which a linear precoder and a nonlinear precoder are coupled to each other as illustrated in FIG. 26, and the second precoding unit 184 may be configured as a linear precoder.

As described above, in a wireless communication system according to the fourth embodiment, the base station 1*b* includes the precoder 18 that can perform linear precoding and nonlinear precoding and, when transmitting a signal obtained by performing nonlinear precoding, further notifies a target terminal of an interfering port number. According to the base station 1*b* of the fourth embodiment, the terminal 2*b* can estimate a channel by using a reference signal generated by nonlinear precoding.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1, 1*b*, 1*b*-1, 1*b*-2 base station, $2_n$, 2-1, 2-22$_1$, terminal, 3, 3*a* receiving device, 11 reception unit, 12 feedback-information processing unit, 13 multiplexing control-signal generation unit, 14 reference-signal-information management unit, 15 reference-signal generation unit, 16 data-signal generation unit, 17 multiplexing unit, 18 precoder, 19 transmitter, 31 reception processing unit, 32, 32a demodulator, 33, 33a control-signal demodulation unit, 41 control unit, 50, 50b transmission device, 181 primary precoding unit, 182 secondary precoding unit, 183 first precoding unit, 184 second precoding unit, 185 selection unit.

The invention claimed is:

1. A transmission device comprising:
    an identifier to identify an interfering terminal that is a possible terminal to perform communication interfering with communication with a target terminal that is a destination terminal of a data signal; and
    a transmitter to set a group ID for reference signal generation to a group formed by the interfering terminal and the target terminal,
    wherein the transmitter transmits the number of terminals that configure the group to the target terminal.

2. The transmission device according to claim 1, wherein the identifier identifies the interfering terminal based on positional information of the target terminal and positional information of another terminal.

3. The transmission device according to claim 1, wherein the identifier identifies the interfering terminal based on information on a beam with maximum power received by the target terminal and information on a beam with maximum power received by another terminal.

4. The transmission device according to claim 1, wherein the identifier identifies the interfering terminal based on spatial correlation between the target terminal and another terminal.

5. The transmission device according to claim 1, wherein the identifier determines that all terminals to which signal transmission is performed simultaneously with signal transmission to the target terminal are the interfering terminals.

6. The transmission device according to claim 1, wherein the transmitter transmits information on a first reference signal and information on a second reference signal to the target terminal, the first reference signal being a reference signal used by the target terminal in demodulation of the data signal, the second reference signal being a reference signal used by the interfering terminal in demodulation of a signal directed to the interfering terminal.

7. The transmission device according to claim 1, wherein each of the terminals retains information on candidates of reference signals assigned to the terminals configuring one of the groups, and
    the transmitter transmits information on a reference signal used by the target terminal in demodulation of the data signal.

8. The transmission device according to claim 7, wherein each of the terminals retains a port mapping table in which a port number indicating a reference signal used by the terminal in demodulation of the data signal, the information on the candidate, and an index associated with the port number and the information on the candidate are registered, and
    the transmitter transmits the index to the target terminal to notify the target terminal of a reference signal used in demodulation of the data signal.

9. The transmission device according to claim 7, further comprising a precoder to perform linear precoding or nonlinear precoding for a transmission signal to the terminal, wherein
    when the precoder performs, in the group, nonlinear precoding and a reference signal is transmitted, the transmitter transmits information on the reference signal used by the target terminal in demodulation of the data signal and information on the reference signal used by the interfering terminal in demodulation of the data signal to the target terminal.

10. The transmission device according to claim 1, wherein, when communication with the target terminal in one group is subjected to interference from communication with a terminal belonging to another group that is different from the one group,
    the transmitter transmits the number of reference signals used in demodulation of the data signal by the terminal that belongs to the another group, which interferes with communication with the target terminal, to the target terminal.

11. A receiving device to receive the data signal transmitted by the transmission device according to claim 6 in the target terminal, the receiving device comprising
    a demodulator to demodulate the data signal based on the information on the first reference signal and to cancel an interference component included in the data signal based on the information on the second reference signal.

12. A base station comprising the transmission device according to claim 1.

13. A terminal comprising the receiving device according to claim 11.

14. A transmission method performed by a transmission device that transmits a data signal, the transmission method comprising:
    identifying an interfering terminal that is a possible terminal to perform communication interfering with communication with a target terminal that is a destination terminal of the data signal;
    setting a group ID for reference signal generation to a group formed by the interfering terminal and the target terminal; and
    transmitting the number of terminals that configured the group to the target terminal.

* * * * *